United States Patent
Deane

(10) Patent No.: US 8,888,080 B1
(45) Date of Patent: Nov. 18, 2014

(54) ANIMAL CARRIER GATE ANTI-RATTLE DEVICE

(76) Inventor: Thomas C. Deane, Redlands, CA (US)

( * ) Notice: Subject to any disclaimer, the term of this patent is extended or adjusted under 35 U.S.C. 154(b) by 191 days.

(21) Appl. No.: 13/419,423

(22) Filed: Mar. 13, 2012

Related U.S. Application Data

(60) Provisional application No. 61/555,330, filed on Nov. 3, 2011.

(51) Int. Cl.
*F16F 1/18* (2006.01)

(52) U.S. Cl.
USPC .......................... 267/158; 267/160; 119/497

(58) Field of Classification Search
USPC ............. 16/85; 188/73.38; 49/415; 267/136, 267/158–160; 292/240–343, DIG. 73
See application file for complete search history.

(56) References Cited

U.S. PATENT DOCUMENTS

| | | | |
|---|---|---|---|
| 1,303,736 A | 5/1919 | Speicher | |
| 1,449,428 A | 3/1923 | McGaffee | |
| 2,065,590 A * | 12/1936 | Jennings | 16/85 |
| 2,417,656 A * | 3/1947 | Lyons | 292/343 |
| 2,564,770 A * | 8/1951 | Spencer | 160/271 |
| 5,016,772 A | 5/1991 | Wilk | |
| 5,054,426 A | 10/1991 | Panarelli | |
| 5,558,041 A | 9/1996 | Fairall | |
| 5,671,697 A | 9/1997 | Rutman | |
| 5,941,348 A * | 8/1999 | Matsumoto et al. | 188/73.38 |
| 5,960,744 A | 10/1999 | Rutman | |
| 6,223,866 B1 * | 5/2001 | Giacomazza | 188/73.38 |
| 6,302,061 B1 | 10/2001 | Weatherby | |
| D453,592 S | 2/2002 | Ross | |
| 6,408,797 B2 | 6/2002 | Pivonka | |
| 6,427,631 B1 | 8/2002 | Ross | |
| 6,523,499 B1 | 2/2003 | Chrisco | |
| 6,539,895 B2 | 4/2003 | Hoagland | |
| 6,863,030 B2 | 3/2005 | Axelrod | |
| 7,040,605 B2 | 5/2006 | Lappen | |
| 7,681,532 B1 | 3/2010 | Deane | |
| 2005/0194223 A1 * | 9/2005 | Murayama | 188/73.38 |
| 2005/0284405 A1 * | 12/2005 | Pomakoy-Poole et al. | 119/497 |

* cited by examiner

*Primary Examiner* — Christopher Schwartz
(74) *Attorney, Agent, or Firm* — Loza & Loza, LLP; Stephen D. Burbach

(57) ABSTRACT

An animal carrier gate anti-rattle device comprises an elastic elongated member having a front surface and a back surface. The elastic elongated member comprises: a proximal section defining a hook that forms an opening facing the front surface; a distal section; and a first bent section between the proximal section and the distal section, where the first bent section has a bend angle of less than 120 degrees relative to the back surface.

20 Claims, 16 Drawing Sheets

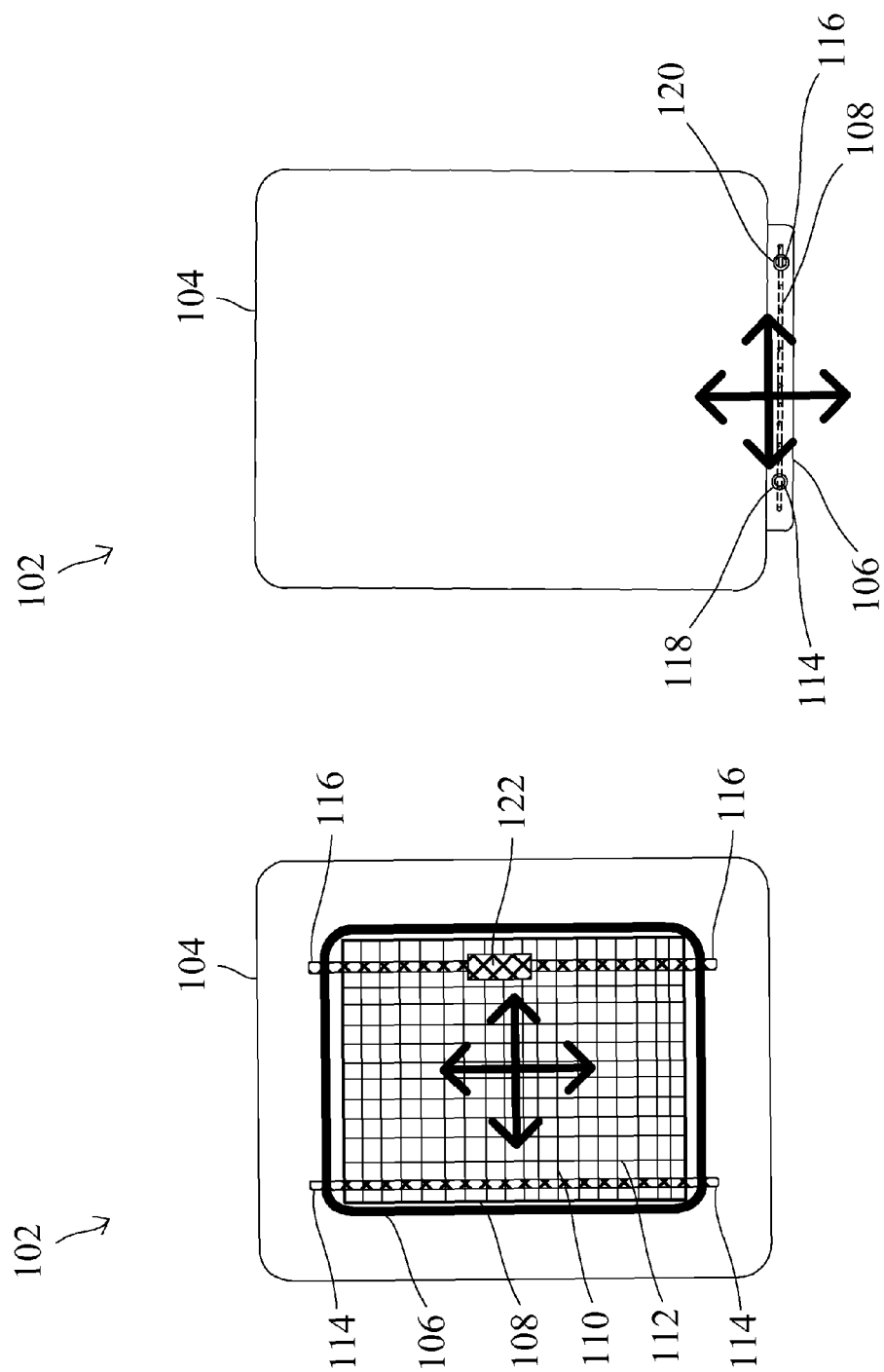

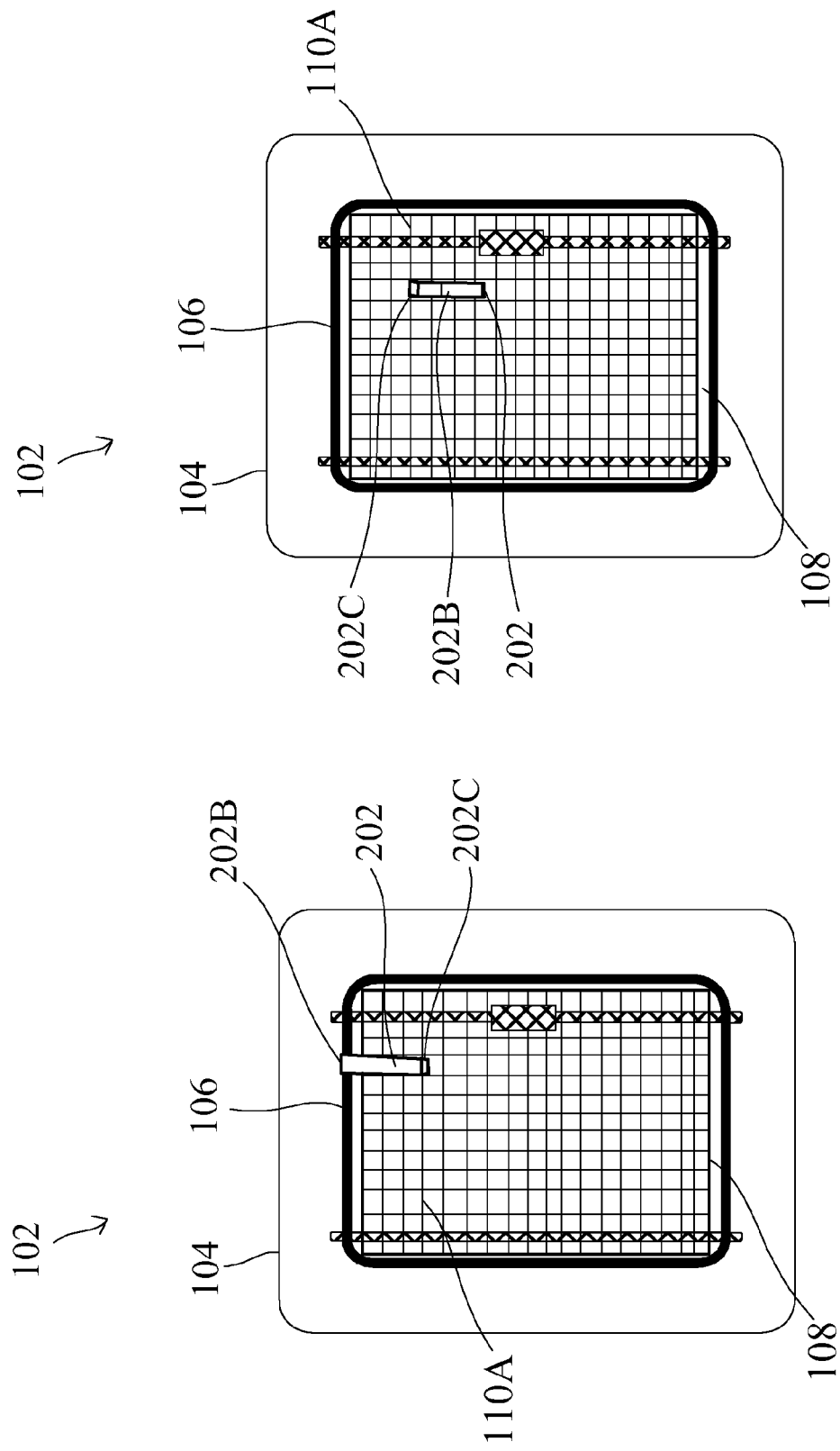

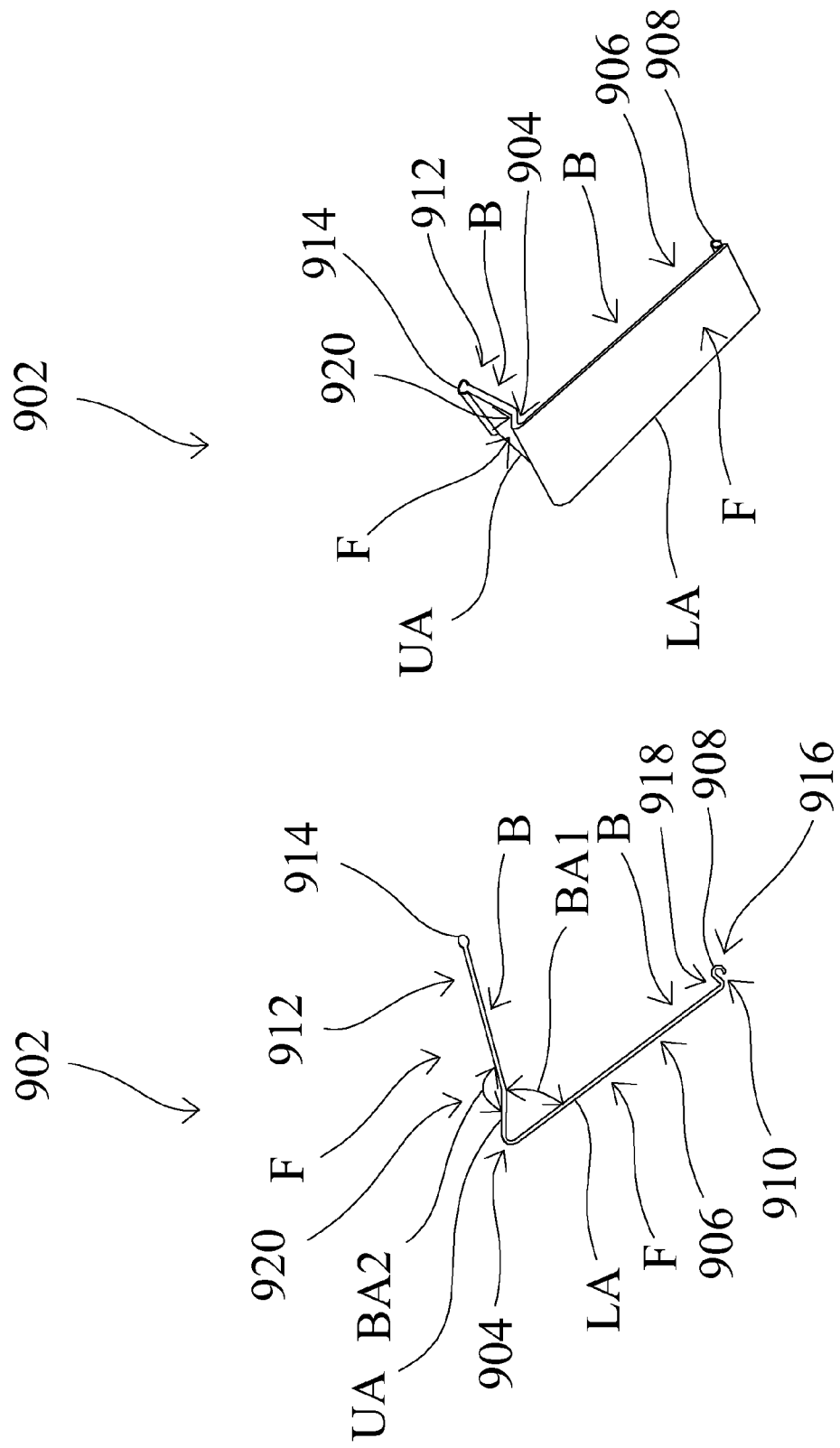

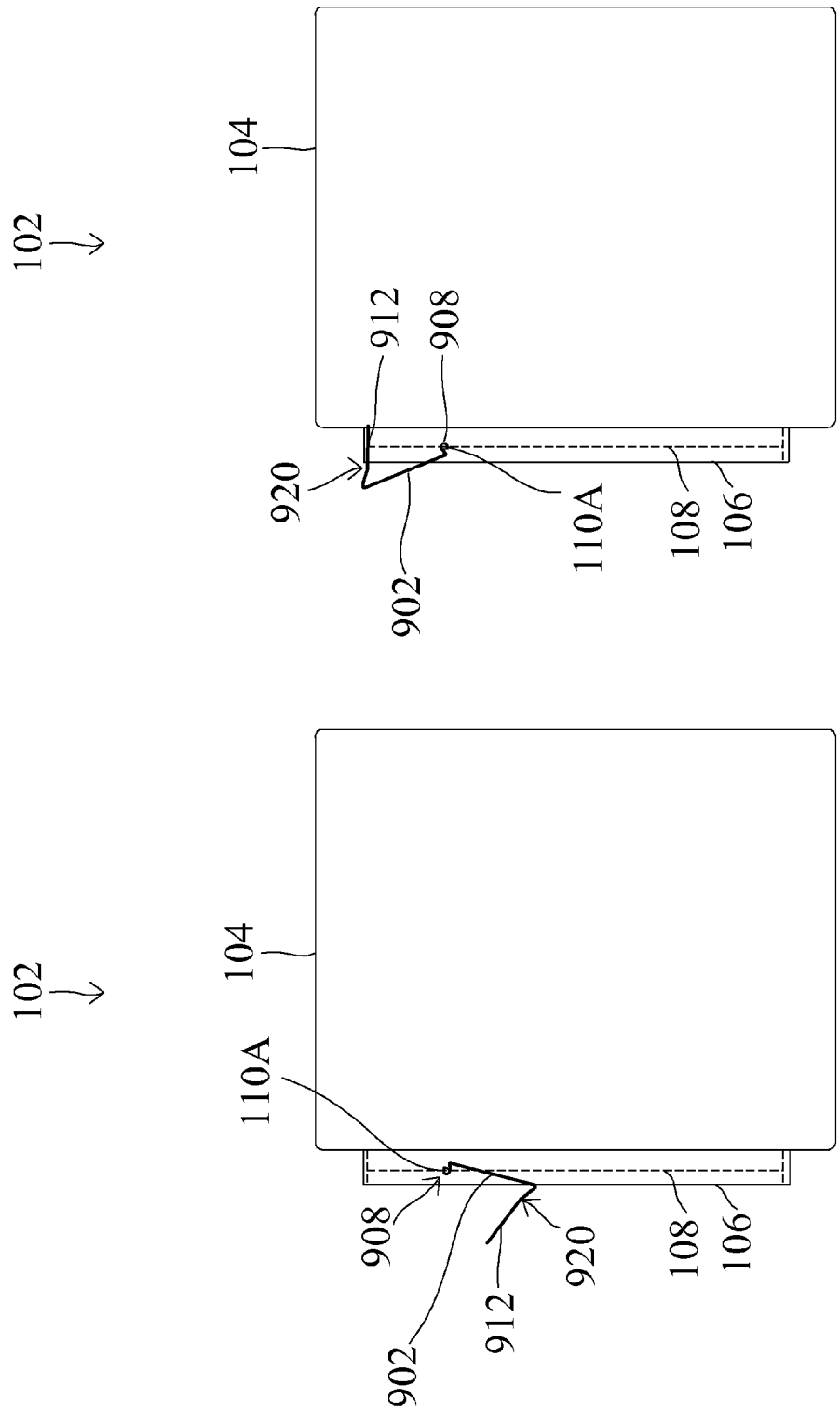

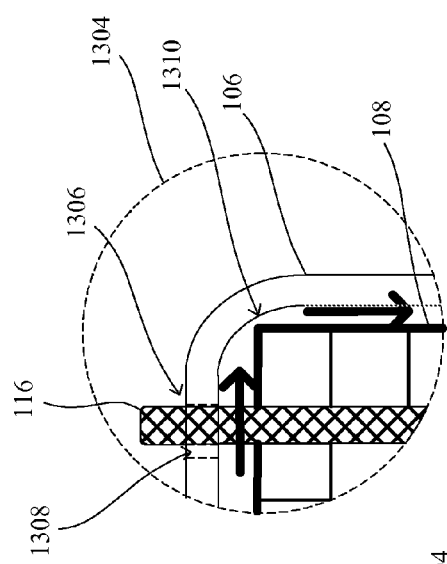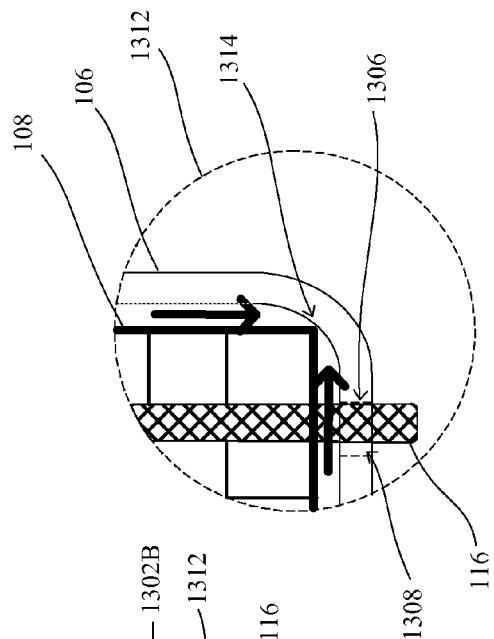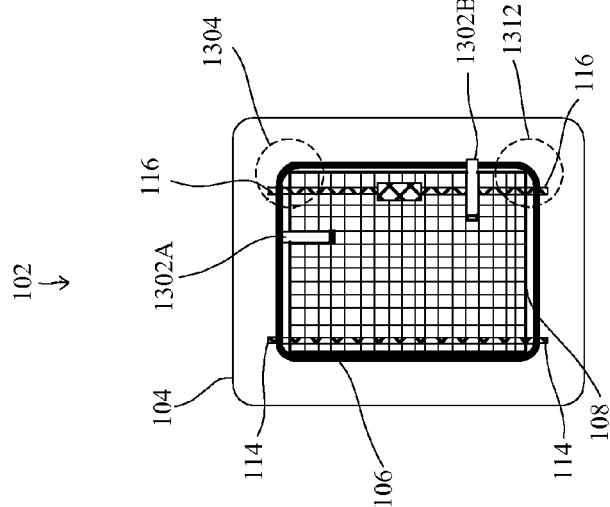

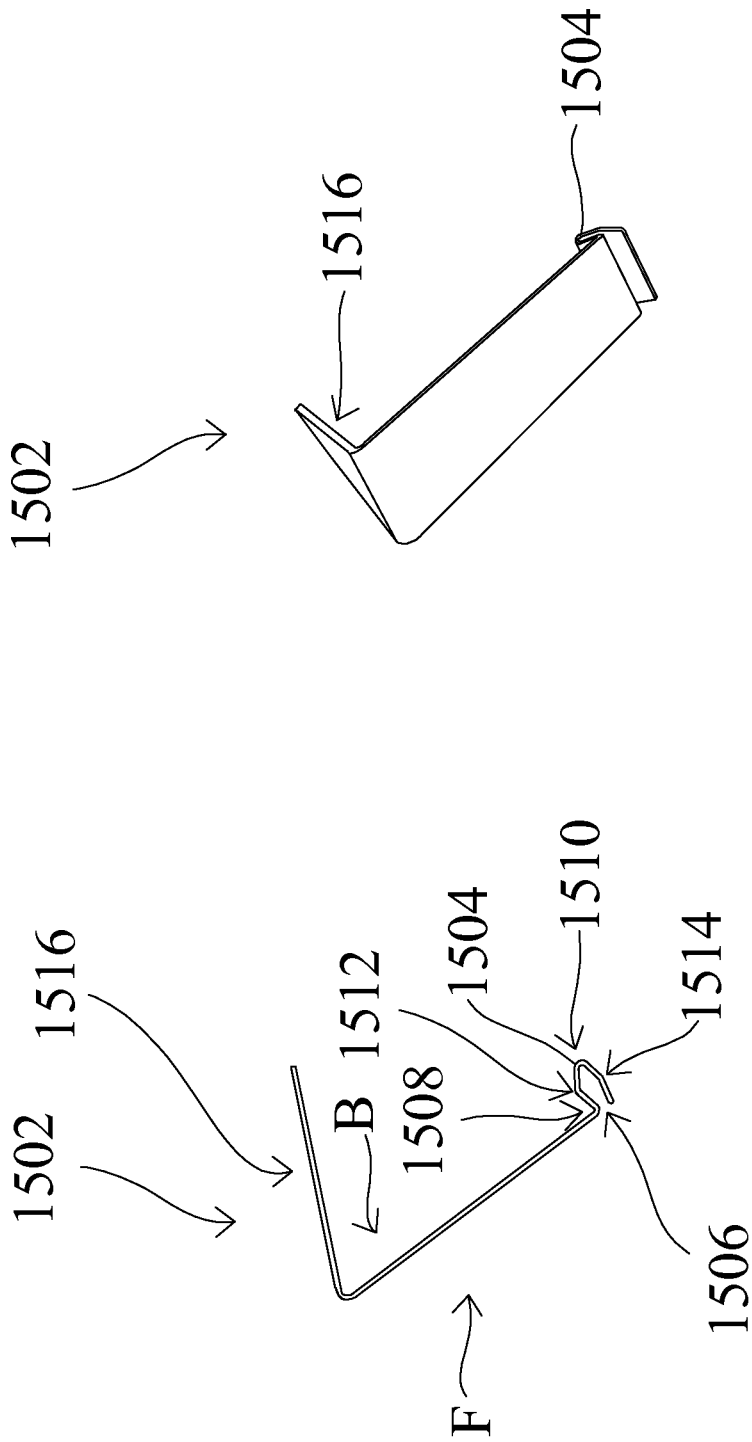

ANIMAL CARRIER GATE ANTI-RATTLE DEVICE

CLAIM OF PRIORITY

This application claims the benefit of and priority to commonly owned U.S. Provisional Patent Application No. 61/555,330, filed Nov. 3, 2011, the disclosure of which is hereby incorporated by reference herein.

TECHNICAL FIELD

The application relates in some aspects to animal transportation and confinement and, more specifically but not exclusively, to a gate anti-rattle device for an animal carrier.

BACKGROUND

Animal carriers are widely used to transport small animals such as cats, dogs, etc. These animal carriers typically include an entry gate that enables an animal to easily be placed within the carrier, removed from the carrier, and secured within the carrier. In some types of animal carriers, the gate may rattle during transportation. This rattling can become problematic during, for example, automotive transportation due to the confined nature of the automobile with respect to accentuating the rattling that is heard by the driver, human passengers, and the transported animal. This rattling can also become problematic with respect to training the animal to enter the carrier (i.e., during "crate training") as the rattling can scare the animal during transportation, causing the animal to associate the carrier with a scary noise (i.e., rattling) and significantly reduce the intended results of crate training efforts.

As a specific example, plastic-based animal carriers typically include a metal entry gate that is mounted within a cowling-like opening that extends slightly from one of the integral vertical surfaces (e.g., front, side, back) of the carrier. The gate is typically constructed of a "mesh" of horizontal and vertical stiff metal rods (e.g., very stiff wire), which is set within a frame of heavier-gauge stiff metal rods of a shape that mimics the shape of the cowling-like opening.

The gate includes a hinge mechanism that provides a pivot point, so that the gate can be swung open and closed. For example, the hinge mechanism may consist of a stiff metal rod (or a pair of short rods) protruding from the top and bottom of one side of the gate. These protruding lengths of metal rods are set into corresponding holes located within the top and bottom sides of the carrier cowling-like opening, creating a pivot point (i.e., a hinge), so that the gate can be swung open and closed.

The other side of the gate typically includes some type of locking mechanism. For example, a locking mechanism may comprise a pair of stiff metal rods protruding from the top and bottom of the other side of the gate that are vertically connected to a spring-loaded mechanism mounted along the same side of the gate. This mechanism allows the rods to be retracted from, and extended into, corresponding holes located within the top and bottom sides of the carrier cowling-like opening so that the gate can be opened (rods retracted) or secured shut (rods extended). Such confinement of an animal within a carrier using the typical gate described above is generally considered to be secure in both stationary and transportation modes, when the gate is in the closed position.

In practice (e.g., due to the production techniques associated with manufacturing the plastic-based carrier and the metal gate), the holes within the carrier cowling-like opening are typically larger than the hinge/lock gate metal rods. In addition, the gate is typically undersized with respect to the carrier cowling-like opening. As a result, the gate may move both horizontally and vertically within the carrier cowling-like opening even when the gate is in the closed and locked position. Consequently, the gate may rattle within the carrier cowling-like opening while the carrier or its transporter (e.g., automobile, trailer, hand-drawn wagon, train, plane, etc.) is moving.

SUMMARY

A summary of several sample aspects of the disclosure and embodiments of an apparatus constructed according to the teaching herein follows. For convenience, the terms "apparatus" and "device" may be used interchangeably herein. It should be appreciated that this summary is provided for the convenience of the reader and does not wholly define the breadth of the disclosure. For convenience, one or more aspects or embodiments of the disclosure may be referred to herein simply as "some aspects" or "some embodiments."

The disclosure relates in some aspects to anti-rattle devices for animal enclosures, carriers, and similar apparatuses. For convenience, these apparatuses may be referred to herein simply as carriers. Accordingly, it should be appreciated that a carrier as described herein is not necessarily directed to an apparatus in which an animal is "carried" from one place to another.

In some aspects, an anti-rattle device is constructed such that upon installation the anti-rattle device exerts a force between the gate and a cowling-like section of the carrier to mitigate (e.g., reduce or eliminate) movement of the gate relative to the cowling-like section. Typically, the cowling-like section comprises a lip that extends slightly from the carrier around the circumference of the opening for the gate. In various embodiments, the anti-rattle device may function to pull the gate toward the carrier body (e.g., the cowling-like section) or the anti-rattle device may function to push the gate away from the carrier body. In doing so, the gate is forced against a portion of the carrier body thereby restricting the movement of the gate.

In some embodiments, an anti-rattle device is constructed of an elongated elastic material (e.g., a relatively thin strip of metal, plastic, etc.) where a first end of the anti-rattle device is configured to engage a rod of a gate and a second end of the anti-rattle device is configured to engage a surface of the cowling-like section of the carrier within which the gate is mounted. The anti-rattle device includes at least one bend such that upon engaging the first end of the anti-rattle device with a rod of the gate, a lower arm of the anti-rattle device extends from the first end along (or somewhat along) the outside of the gate to an edge of the gate and then, after a bend (e.g., less than 90 degrees), an upper arm of the anti-rattle device extends toward an inner or outer surface of the cowling-like section.

Here, through proper positioning of an appropriately-shaped anti-rattle device on the gate and a surface of the cowling-like section, the first end of the anti-rattle device will exert a force on the gate sufficient to mitigate rattling. The anti-rattle device is bent slightly upon installation such that the elasticity of the anti-rattle device will tend to expand or contract back to its normal resting state and thereby push or pull on the gate relative to the surface of the cowling-like section. For example, if the second end of the anti-rattle device is placed on an inner surface of the cowling-like section, the first end of the anti-rattle device will exert a force on the gate that tends to push the gate away from the second end of the anti-rattle device. Conversely, if the second end of the anti-rattle device is placed on an outer surface of the cowling-like section, the first end of the anti-rattle device will exert a force on the gate that tends to pull the gate toward the second end of the anti-rattle device.

Advantageously, a single anti-rattle device may be used on different types of carriers. As discussed above, the second end of a given anti-rattle device may be installed on an inner or outer surface of the cowling-like section, or on a flange-like surface located within a cowling-like opening. Consequently, such an anti-rattle device may be effectively used on carriers with different types of cowling-like sections or on carriers without cowling-like gate openings. A pet owner may thus only need to buy a single anti-rattle device for multiple carriers or a retailer may only need to stock one type of anti-rattle device (or relatively few types of anti-rattle devices).

In view of the above, in some embodiments, an animal carrier gate anti-rattle device comprises an elastic elongated member having a front surface and a back surface. The elastic elongated member comprises: a proximal section defining a hook that forms an opening facing the front surface; a distal section (e.g., comprising a protrusion that protrudes from the front surface in some embodiments); and a first bent section between the proximal section and the distal section, where the first bent section has a bend angle of less than 90 degrees relative to the back surface.

Applications of one or more of the embodiments may include, without limitation, one or more of the following:

1) An animal carrier gate anti-rattle device that can be used to prevent rattling of an animal carrier gate that is deployed within a gate opening (e.g., a cowling-like opening) of an animal carrier (e.g., an animal carrier having a plastic body and a metal gate);

2) An animal carrier gate anti-rattle device that can be used at multiple locations along the top, bottom, and either side of an animal carrier gate to prevent rattling of the gate within a gate opening (e.g., a cowling-like opening) of an animal carrier;

3) An animal carrier gate anti-rattle device that can be secured to either vertical rods or horizontal rods that comprise the animal carrier gate via a hooked end (or some other means of engagement) that prevents loss of the anti-rattle device when not in use by securing the anti-rattle device to the gate of the animal carrier;

4) An animal carrier gate anti-rattle device that is swung from an unengaged position to an engaged position via an arc-like movement of the unattached end of the anti-rattle device around the attached end of the anti-rattle device relative to the animal carrier gate;

5) An animal carrier gate anti-rattle device that increases friction between the animal carrier gate and a surrounding gate opening (e.g., cowling-like opening) to prevent unnecessary rattling of the gate within the gate opening;

6) An animal carrier gate anti-rattle device that can be used to prevent rattling of the typical animal carrier gate by an expansion action in that the gate is pushed firmly against an opposite interior surface of the gate opening (e.g., cowling-like opening) of the animal carrier, relative to the location of the anti-rattle device; or 7) An animal carrier gate anti-rattle device that can be used to prevent rattling of an animal carrier gate by a compression action in that the gate is pulled firmly against an adjacent interior surface of the gate opening (e.g., cowling-like opening) of the animal carrier, relative to the location of the anti-rattle device.

BRIEF DESCRIPTION OF THE DRAWINGS

These and other aspects of the disclosure will be more fully understood when considered with respect to the following detailed description, the appended claims, and the accompanying drawings, wherein:

FIG. 1A is a simplified front view of a sample animal carrier;

FIG. 1B is a simplified top view of the animal carrier of FIG. 1A;

FIG. 3A is a simplified front view of the anti-rattle device of FIG. 2A in an engaged position on the animal carrier of FIG. 1A;

FIG. 3B is a simplified front view of the anti-rattle device of FIG. 2A in an unengaged position on the animal carrier of FIG. 1A;

FIG. 9A is a simplified side view of an embodiment of an anti-rattle device;

FIG. 9B is a simplified perspective view of the anti-rattle device of FIG. 9A;

FIG. 10A is a simplified side view of the anti-rattle device of FIG. 9A in an unengaged position on the animal carrier of FIG. 1A;

FIG. 10B is a simplified side view of the anti-rattle device of FIG. 9A in an engaged position on the animal carrier of FIG. 1A;

FIG. 13A is a simplified front view of anti-rattle devices in engaged positions on the animal carrier of FIG. 1A;

FIG. 13B is a simplified partial view illustrating potential effects of the anti-rattle devices of FIG. 13A on the gate of the animal carrier of FIG. 1A;

FIG. 13C is another simplified partial view illustrating potential effects of the anti-rattle devices of FIG. 13A on the gate of the animal carrier of FIG. 1A;

FIG. 15A is a simplified side view of an embodiment of an anti-rattle device;

FIG. 15B is a simplified perspective view of the anti-rattle device of FIG. 15A;

Figure 2B:
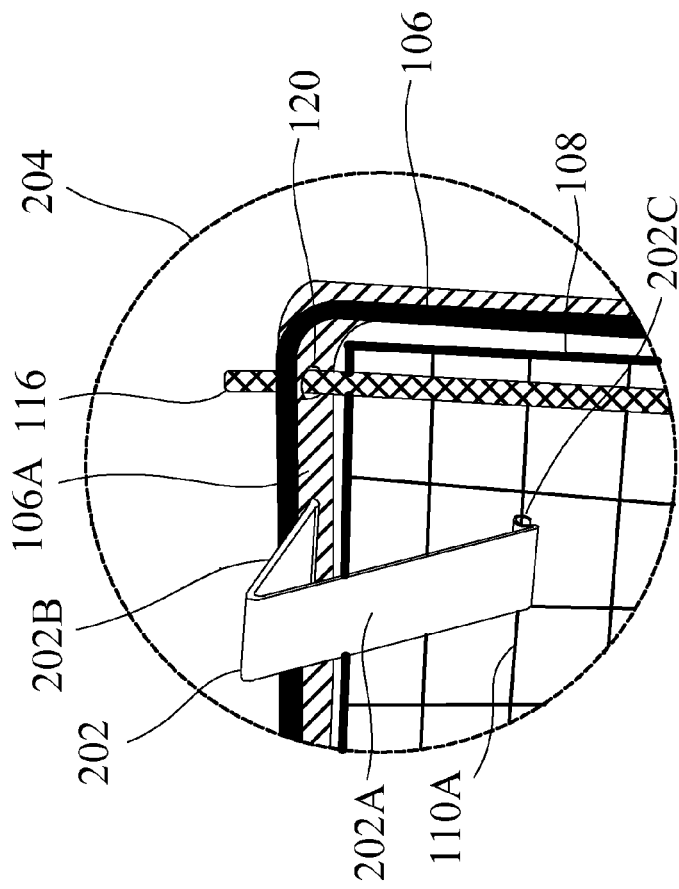
FIG. 2B is a simplified partial view illustrating the anti-rattle device of FIG. 2A installed on the animal carrier of FIG. 1A.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The description that follows sets forth one or more illustrative embodiments. It will be apparent that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

For purposes of illustration, sample embodiments of an anti-rattle device for a carrier will be described in the context of an animal carrier that has a plastic body comprising a cowling-like section surrounding a gate opening (e.g., cowling-like opening) for a metal gate, where the metal gate comprises a mesh of metal rods. It should be appreciated based on the teachings herein, however, that an anti-rattle device may be used with other types of carriers (e.g., constructed using different types of material and components).

FIGS. 1A and 1B illustrate a carrier 102 comprising a plastic body 104, a cowling-like section 106 surrounding an opening for a gate 108. FIG. 1A is a representative front view. FIG. 1B is a representative top view. FIG. 1A illustrates that the cowling-like section 106 has four sides (top, bottom, left, and right sides). FIG. 1B illustrates that the cowling-like section 106 extends slightly from the front of the body 104 (e.g., by approximately an inch).

The gate 108 is constructed of a mesh of horizontal rods (e.g., rod 110) and vertical rods (e.g., rod 112). In some implementations, the rods comprise solid metallic wire. The rods may have a thickness of, for example, approximately 14 gauge to 10 gauge.

A stiff metal rod 114 (e.g., stiffer than the horizontal rods 110 and the vertical rods 112) protrudes from the top and bottom of the gate 108 to provide a hinge mechanism. The protruding portions of the rod 114 pass through corresponding holes (e.g., hole 118) located within the top and bottom sides of the cowling-like section 106, thereby creating a pivot point that enables the gate 108 to be swung open and closed. FIG. 1B illustrates a hole 118 in the top side of the cowling-like section 106 through which the top portion of the rod 114 extends.

The gate also includes a locking mechanism comprising a pair of stiff metal rods 116 (e.g., stiffer than the horizontal rods 110 and the vertical rods 112) protruding from the top and bottom of the gate 108. The rods 116 are vertically connected to a spring-loaded mechanism 122 that allows the rods 116 to be retracted from, and extended into, corresponding holes (e.g., hole 120) located within the top and bottom sides of the cowling-like section 106. FIG. 1B illustrates a hole 120 in the top side of the cowling-like section 106 through which the top rod 116 extends. When the rods 116 are extended through the holes in the cowling-like section 106 as shown in FIG. 1A, the gate 108 is locked shut. When the rods 116 are retracted (not shown), the gate 108 is unlocked and may, therefore, be swung open.

The construction of the carrier 102 typically results in the gate 108 rattling during movement of the carrier 102 even when the gate 108 is in the closed and locked position. In practice, the gate 108 is sized slightly smaller than the gate opening of the body 104 to enable the gate 108 to swing freely within the gate opening. As a result, the gate 108 may move horizontally and/or vertically within the carrier cowling-like section 106 as represented by the large arrows in FIG. 1A. In addition, as shown in FIG. 1B, the diameters of the holes (e.g., holes 118 and 120) within the cowling-like section 106 are typically larger than the diameters of the rods 114 and 116. Consequently, the gate 108 may move laterally as represented by the large arrows in FIG. 1B.

Figure 2A:
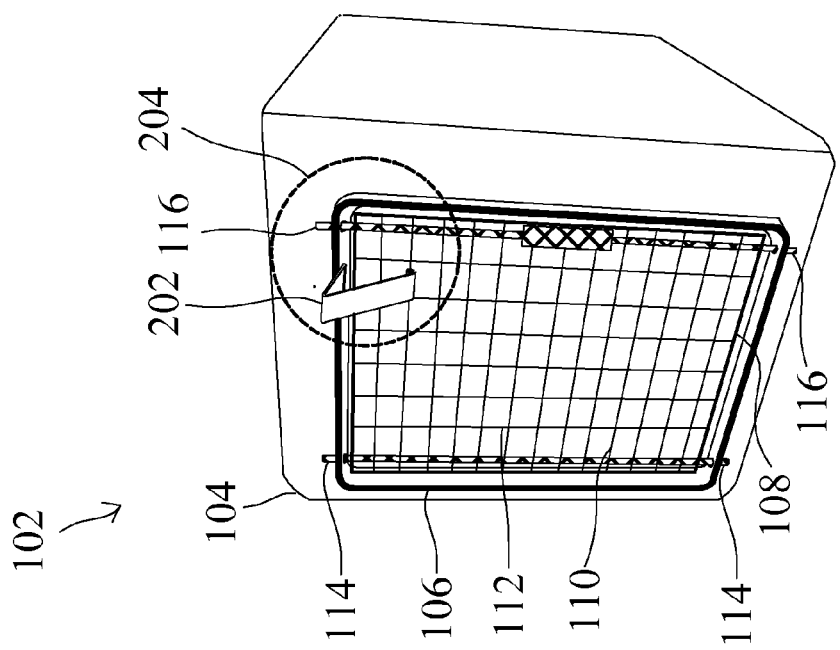
FIG. 2A is a simplified perspective view of an embodiment of an anti-rattle device installed on the animal carrier of FIG. 1A.

FIG. 2A illustrates a perspective view of an embodiment of an anti-rattle device 202 that may be used to mitigate rattling of the gate 108 relative to the body 104 of the carrier 102. FIG. 2B is an enlargement of the view denoted by the dashed circle 204. To reinforce how an anti-rattle device may interact with the carrier 102, several of the components of the carrier 102 are specifically referenced in FIGS. 2A and 2B (and in other figures that follow). To avoid unnecessary repetition, however, not all of these components are discussed in the description of FIGS. 2A and 2B (and the other figures).

Referring to FIG. 2B, the anti-rattle device 202 includes a lower arm 202A and an upper arm 202B. The lower arm 202A comprises an attachment structure 202C that is used to releasably couple the anti-rattle device 202 to a rod (e.g., horizontal rod 110A in FIG. 2B) of the gate 108. The anti-rattle device 202 is bent between the lower arm 202A and the upper arm 202B to enable the upper arm 202B to be slid under or over the cowling-like section 106.

At least a portion of the anti-rattle device 202 is constructed of an elastic material (e.g., the entire anti-rattle device 202 or the bent section). This enables the anti-rattle device 202 to be temporarily compressed (e.g., the upper arm 202B bent toward the lower arm 202A) or expanded (e.g., the upper arm 202B bent away from the lower arm 202A) upon installation.

In the example of FIGS. 2A and 2B, the anti-rattle device 202 is slightly compressed to enable the upper arm 202B to be positioned underneath a lower surface 106A of the cowling-like section 106. Here, as a result of compressing the anti-rattle device 202, the anti-rattle device 202 exerts a downward force on the gate 108 via expansion of the anti-rattle device 202.

Alternatively, upon installation, the anti-rattle device 202 could be slightly expanded to enable the upper arm 202B to be positioned on top of an upper surface (not shown) of the cowling-like section 106. In this case, as a result of expanding the anti-rattle device 202, the anti-rattle device 202 exerts an upward force on the gate 108 via compression of the anti-rattle device 202.

It should be appreciated that in different types of carriers, the surfaces of the cowling-like section 106 may not be a simple flat surface (e.g., as shown in FIGS. 2A and 2B). For example, such a surface may comprise a protrusion (e.g., a downward running flange) upon which the top section 202B of the anti-rattle device 202 may placed upon installation (see FIGS. 16A and 16B).

FIGS. 3A and 3B depict, from a front perspective of the carrier 102, the anti-rattle device 202 in an engaged position and an unengaged position, respectively. In both FIGS. 3A and 3B, the anti-rattle device 202 is securely attached to the horizontal rod 110A via the attachment structure 202C.

In the engaged position of FIG. 3A, the gate 108 is either pushed toward the opposite (lower) side of the cowling-like section 106 or pulled toward the adjacent (upper) side of the cowling-like section 106 depending on whether the upper arm 202B of the anti-rattle device 202 is positioned on an inner surface of the cowling-like section 106 (e.g., a lower surface of the top side) or an outer surface of the cowling-like section 106 (e.g., an upper surface of the top side) as discussed above. The forces at work here will be briefly discussed.

In the former case, as a result of compressing the anti-rattle device 202 to place the upper arm 202B on the inner (e.g., lower) surface of the cowling-like section 106, the anti-rattle device 202 exerts a downward force on the gate 108 since the elasticity of the anti-rattle device 202 will cause it to try to expand back to its normal uncompressed shape via expansion of the anti-rattle device 202. Thus, the bottom of the gate 108 may be forced against the inner surface of the bottom side of the cowling-like section 106 which, as a result of increased friction, will tend to prevent rattling of the gate 108 that could otherwise occur when the carrier 102 is moved.

In the latter case, as a result of expanding the anti-rattle device 202 to place the upper arm 202B on the outer (e.g., top) surface of the cowling-like section 106, the anti-rattle device 202 exerts an upward force on the gate 108 since the elasticity of the anti-rattle device 202 will cause it to try to compress back to its normal unexpanded shape via compression of the anti-rattle device 202. Thus, in this case, the top of the gate 108 may be forced against the inner surface of the top side of the cowling-like section 106 which, as a result of increased friction, will tend to prevent rattling of the gate 108 that could otherwise occur when the carrier 102 is moved.

In the unengaged position of FIG. 3B, the gate 108 is neither pushed toward the opposite (lower) side of the cowling-like section 106 of the carrier 102 via expansion of the anti-rattle device 202 nor pulled toward the adjacent (upper) side of the cowling-like section 106 of the carrier 102 via compression of the anti-rattle device 202. Nevertheless, the attachment structure 202C may be constructed to enable the anti-rattle device 202 to be attached to the gate 108 in a relatively secure manner. Consequently, a user will be less likely to lose the anti-rattle device 202. For example, the attachment structure 202C may take the form of a partially closed hook where the hook opening is slightly smaller than the diameter of the rod 110A such that the hook can be securely clipped onto the rod 110A.

Figures 4A, 4B:
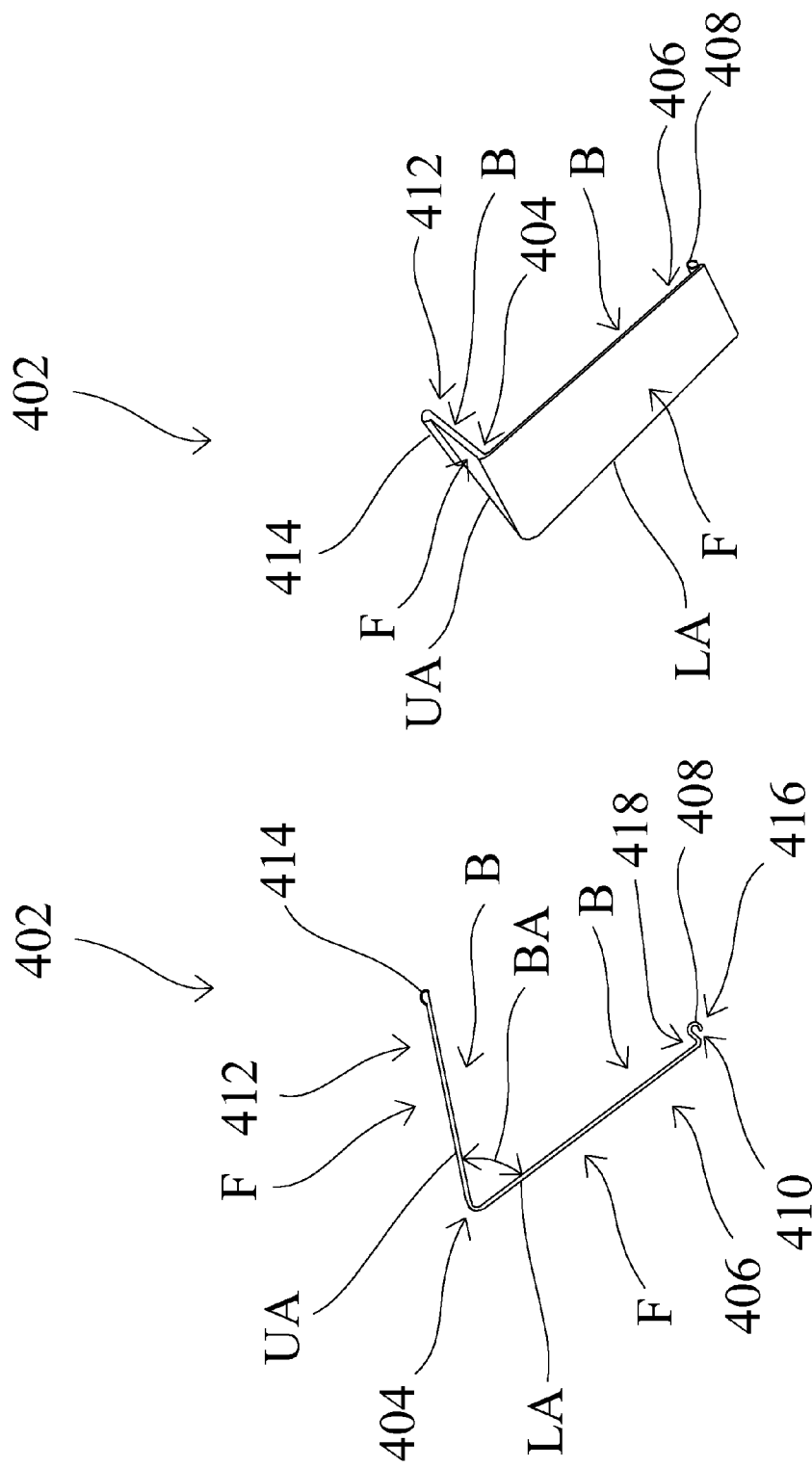
FIG. 4A is a simplified side view of an embodiment of an anti-rattle device.
FIG. 4B is a simplified perspective view of the anti-rattle device of FIG. 4A.

FIGS. 4A and 4B illustrate two views of an embodiment of an animal carrier gate anti-rattle device 402. FIG. 4A illustrates the anti-rattle device 402 from the right side, after it has been slightly rotated top-toward front. FIG. 4B illustrates the anti-rattle device 402 from a frontal perspective, after it has been slightly rotated slightly top-toward-front and axially toward the right.

In some implementations, the anti-rattle device 402 comprises an elastic elongated member. For example, the anti-rattle device 402 may have a shape that is relatively thin, narrow, and long. In addition, the anti-rattle device 402 may be constructed, at least in part, of a material that has elastic properties. In typical embodiments, the anti-rattle device 402 is constructed of a thin metallic or plastic material. For purposes of illustration, the anti-rattle device 402 (e.g., the elastic elongated member) will be referred to as having a front surface F and a back surface B.

The anti-rattle device 402 comprises two arms that are, in effect, delineated by a bent section 404 of the anti-rattle device 402. For purposes of illustration, one arm is referred to as a lower arm LA and the other arm is referred to as an upper arm UA.

An end section 406 of the lower arm LA defines an attachment structure in the shape of a hook 408 that forms an opening 410 facing the front surface F. For convenience, the end section 406 may be referred to herein as a proximal section of the elastic elongated member.

The proximal section of the elastic elongated member is thus fashioned such that the anti-rattle device 402 can be releasably attached to a horizontal rod or a vertical rod of a gate for an animal carrier (e.g., rods 110 or 112). For example, the hook 408 may be hooked onto (e.g., clipped onto) a horizontal rod 110 that is near the top or bottom of the gate 108, or the hook 408 may be hooked onto a vertical rod 112 that is near either side of the gate 108. Once the hook 408 is attached to a rod (e.g., rods 110 or 112), the upper arm UA of the anti-rattle device 402 may be swung in an arc-like fashion between engaged and unengaged positions (e.g., as in FIGS. 3A and 3B).

An end section 412 of the upper arm UA comprises a protrusion 414 that protrudes from the front surface F. For example, the end section 412 may be fashioned such that it thickens outward from the longitudinal axis of the upper arm UA. The resulting protrusion will help prevent the anti-rattle device 402 from accidentally unengaging via a slipping action from an inner surface of the cowling-like section 106 (e.g., from surface 106A of FIG. 2B) and thereby allowing the gate 108 to inadvertently commence rattling. For example, the upper arm UA may be inserted far enough so that the protrusion 414 engages the innermost edge of the inner surface of the cowling-like section 106 (e.g., the edge closest to the interior space of the carrier). In this case, the protrusion 414 may also provide a safety feature to prevent inadvertent injury to an animal confined within the carrier 102. For convenience, the end section 412 may be referred to herein as a distal section of the elastic elongated member.

Due to the elasticity of the anti-rattle device 402 (e.g., the elasticity of the entire anti-rattle device 402 or the bent section 404), the arms LA and UA effectively act as a spring where the arms LA and UA can contract inward toward each other (via compression of the anti-rattle device 402) and expand outward away from each other (via expansion of the anti-rattle device 402). Thus, as discussed herein, the anti-rattle device 402 may be deployed in different ways to provide the best fit for applications. For example, different deployments (on either the inner or outer surface of the cowling-like section 106) may be used on different types of animal carriers. As another example, a particular deployment may be used in view of the distances from a rod (e.g., rod 110 or 112) of a gate 108 on which the anti-rattle device 402 is to be mounted to the inner and outer surfaces of the cowling-like section 106 of the carrier 102.

As mentioned above, the elastic elongated member comprises a bent section 404 between the proximal and distal sections (e.g., sections 406 and 412). In some embodiments, the bent section 404 has a bend angle BA of less than 90 degrees relative to the back surface B. In this way, upon compression or expansion of the elastic elongated member, the distal section 412 of the elastic elongated member may be positioned on an inner or outer surface of the cowling-like section 106 when the proximal section 406 of the elastic elongated member is attached to a horizontal rod (e.g., rod 110) or a vertical rod (e.g., rod 112) of the gate 108. In some embodiments, the bent section 404 has a bend angle BA of less than 120 degrees and more than 90 degrees relative to the back surface B. In this case, upon compression of the elastic elongated member, the distal section 412 of the elastic elongated member may be positioned on an inner surface of the cowling-like section 106 when the proximal section 406 of the elastic elongated member is attached to a horizontal rod (e.g., rod 110) or a vertical rod (e.g., rod 112) of the gate 108.

The hook 408 may be formed in various ways. In some embodiments, the opening 410 of the hook 408 is greater than or equal to 0.05 inches in width and/or the opening 410 of the hook 408 is less than or equal to 0.30 inches in width. In this way, the hook 408 may effectively engage a typical animal carrier gate horizontal or vertical rod (e.g., rod 110 or 112) having a diameter within the range of approximately 0.05 inches wide to 0.30 inches wide.

In some embodiments, an attachment structure of an anti-rattle device has a substantially curvilinear shape. For example, the hook 408 comprises a section 416 that comprises at least one curvilinear bend toward the front surface F. As discussed below, in other embodiments an attachment structure may take a different shape (e.g., comprising a plurality of angular bends or some other suitable shape).

An attachment structure of an anti-rattle device also includes at least one bend that facilitates keeping the attachment structure on a horizontal rod (e.g., rod 110) or a vertical rod (e.g., rod 112) of a gate while the anti-rattle device 402 is under compression or expansion. For example, the hook 408 comprises a section 418 that is bent relative to the back surface B by approximately 90 degrees. In some embodiments, the section 418 is bent relative to the back surface B by less than or equal to approximately 90 degrees.

The protrusion 414 may be formed in various ways. In some embodiments, the protrusion 414 protrudes from the front surface F of the distal section 412 by a distance that is greater than 0.06 inches and/or less than 0.25 inches. In this way, the protrusion 414 may effectively catch an edge of the cowling-like section 106 of the carrier 102 while still allowing easy insertion and removal of the distal section 412.

The elastic elongated member may be formed in various shapes depending on, for example, the size and/or other characteristics (e.g., the length between a gate rod and a surface of the cowling-like section) of the carriers for which the anti-rattle device 402 is intended for use. For example, in some embodiments the length of the elongated member between the protrusion 414 and the bent section 404 is less than or equal to 4.00 inches. In some embodiments, the length of the elongated member between the protrusion 414 and the bent section 404 is less than or equal to 3.00 inches (e.g., approximately 2.50 inches). In some embodiments, the length of the elongated member between the hook 408 and the bent section 404 is less than or equal to 12.00 inches. In some embodiments, the length of the elongated member between the hook 408 and the bent section 404 is less than or equal to 4.00 inches (e.g., approximately 3.00 inches).

The elastic elongated member may be constructed of various materials depending on, for example, the size and/or other characteristics (e.g., the weight of the gate 108) of the carriers for which the anti-rattle device 402 is intended for use. In some embodiments, the elongated member is constructed of a flat unitary material. In some embodiments, the flat unitary material has a thickness (e.g., as seen from the view of FIG. 4A) that is less than or equal to 0.25 inches. In some embodiments, the flat unitary material has a thickness (e.g., as seen from the view of FIG. 4A) that is less than or equal to 0.10 inches. In some embodiments, the flat unitary material has a width (e.g., as seen from the front view of FIG. 3A) that is less than or equal to 1.0 inches. In some embodiments, the flat unitary material comprises a flat metallic material. In some embodiments, the flat unitary material comprises a flat plastic material. In some embodiments, the flat unitary material comprises a flat composite material.

Figure 5A:
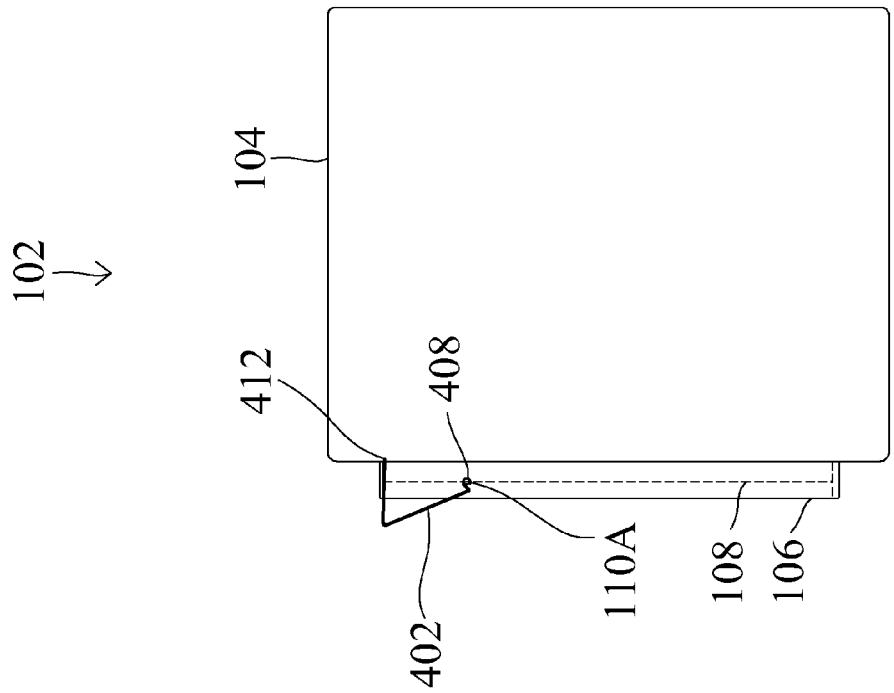
FIG. 5A is a simplified side view of the anti-rattle device of FIG. 4A in an unengaged position on the animal carrier of FIG. 1A.

FIGS. 5A-7 illustrate simplified views of the anti-rattle device 402 from the right-hand side of the animal carrier 102. FIGS. 5A and 5B illustrate more simplified views, while FIGS. 6 and 7, respectively, illustrate a more detailed view of an expansion use and a compression use of the anti-rattle device 402. To further reinforce how an anti-rattle device may interact with the carrier 102, several of the components of the anti-rattle device 402 are specifically referenced in FIGS. 5A and 5B (and in other figures that follow). To avoid unnecessary repetition, however, not all of these components are discussed in the description of FIGS. 5A and 5B (and the other figures).

Figure 5B:
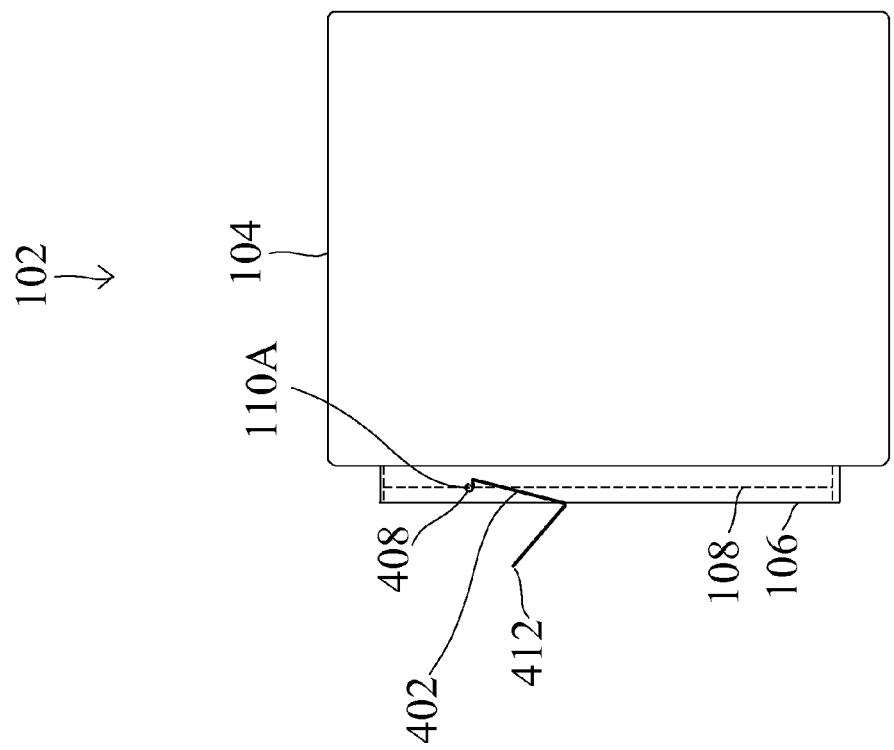
FIG. 5B is a simplified side view of the anti-rattle device of FIG. 4A in an engaged position on the animal carrier of FIG. 1A.

FIGS. 5A and 5B depict the anti-rattle device 402 in an unengaged position and an engaged position, respectively, along the top of the gate 108. For purposes of illustration, the gate 108 is depicted by a dashed vertical line to indicate that from this view the gate 108 is behind the right side of the cowling-like section 106.

In both FIGS. 5A and 5B, the anti-rattle device 402 is securely attached via the hook 408 to a horizontal stiff metal rod 110A comprising a portion of the gate 108. In the unengaged position of FIG. 5A, the gate 108 is neither pushed via expansion toward the opposite (lower) side of the cowling-like section 106 nor pulled via compression toward the adjacent (upper) side of the cowling-like section 106. In the engaged position of FIG. 5B, the gate 108 is pushed toward the opposite (lower) side of the cowling-like section 106 via expansion (described in more detail below in conjunction with FIG. 6). Alternatively, as described in more detail below in conjunction with FIG. 7, the gate 108 could be pulled toward the adjacent (upper) side of the cowling-like section 106 via compression (not shown in FIG. 5B).

Figure 6:
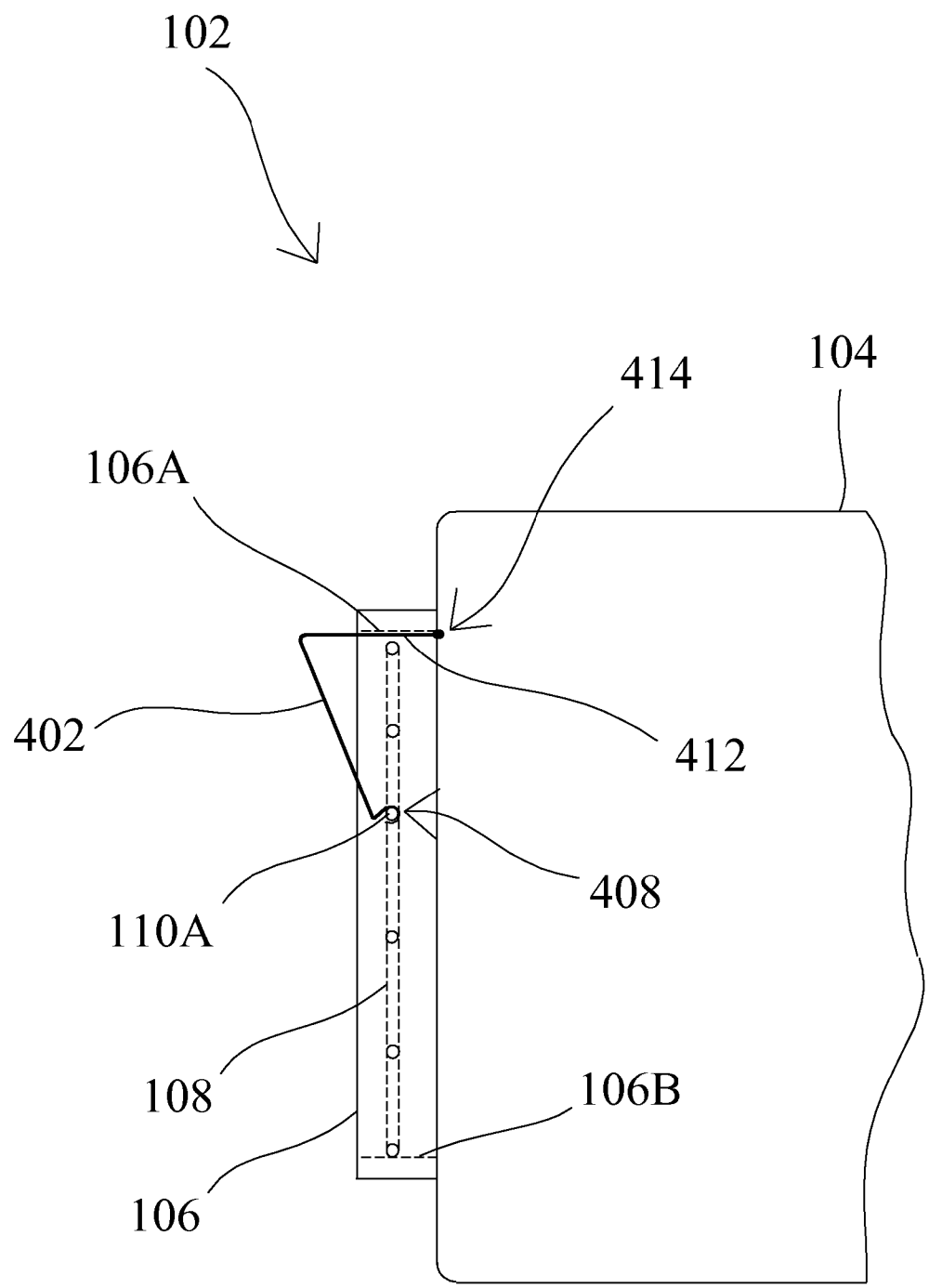
FIG. 6 is a simplified side view of the anti-rattle device of FIG. 4A in an engaged position on an inner surface of a cowling-like section of the animal carrier of FIG. 1A.

FIG. 6 is a more detailed view of the anti-rattle device 402 in an engaged position along the top of the gate 108 illustrating an example of expansion use (i.e., where an anti-rattle device 402 acts on a gate 108 via an expansion force). For purposes of illustration, the gate 108 is depicted by dashed vertical lines and circles to indicate that from this view the gate 108 is behind the right side of the cowling-like section 106.

In this expansion-use configuration, the distal section 412 of the anti-rattle device 402 is positioned against an inner surface 106A (a lower surface in this example) of the cowling-like section 106 of the carrier 102. Consequently, due to the expansion action of the upper and lower arms of the anti-rattle device 402, the gate 108 is pushed toward the opposite (lower) side of the cowling-like section 106, thereby stabilizing the lower portion of the gate 108 against an inner surface 106B of the lower side of the cowling-like section 106 via increased friction. It should be noted that although FIG. 6 depicts the expansion use of the anti-rattle device 402 along the top of the gate 108, this action also may be attained when the anti-rattle device 402 is used along the bottom or either side of the gate 108.

FIG. 6 also illustrates that in this configuration the protrusion 414 is positioned beyond an innermost edge (toward the interior of the body 104) of the inner surface 106A. Consequently, the protrusion will tend to catch on the edge and prevent the distal section 412 from inadvertently sliding out (toward the left in FIG. 6) of the cowling-like section (opening) 106. In this case, the protrusion 414 may also provide a safety feature to prevent inadvertent injury to an animal confined within the carrier 102.

Figure 7:
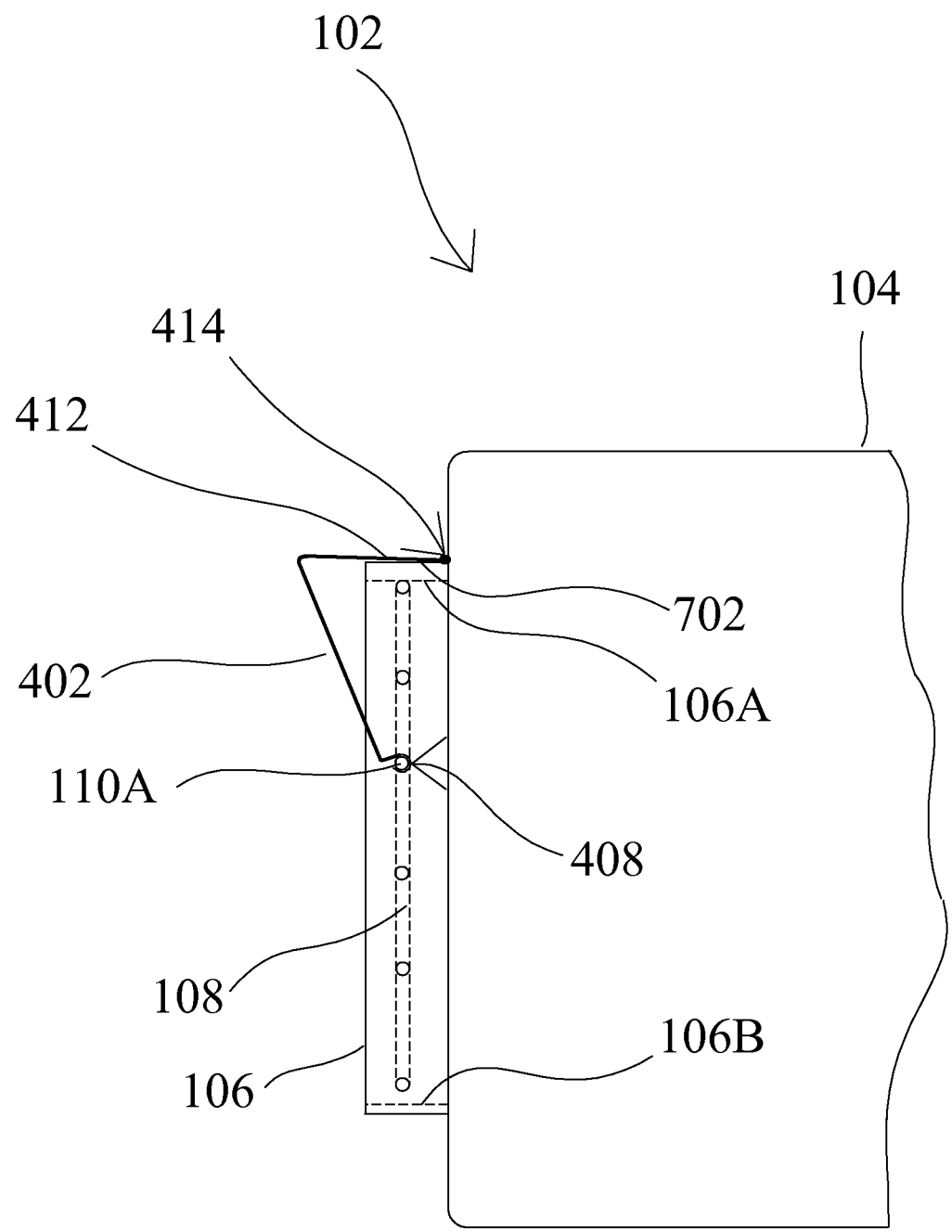
FIG. 7 is a simplified side view of the anti-rattle device of FIG. 4A in an engaged position on an outer surface of a cowling-like section of the animal carrier of FIG. 1A.

FIG. 7 is a more detailed view of the anti-rattle device 402 in an engaged position along the top of the gate 108 illustrating an example of compression use (i.e., where an anti-rattle device 402 acts on the gate 108 via a compression force). For purposes of illustration, the gate 108 is again depicted by dashed vertical lines and circles to indicate that from this view the gate 108 is behind the right side of the cowling-like section 106.

In this compression-use configuration, the distal section 412 of the anti-rattle device 402 is positioned against an outer surface 702 (an upper surface in this example) of the cowling-like section 106 of the carrier 102. Consequently, due to the compression action of the upper and lower arms of the anti-rattle device 402, the gate 108 is pulled toward the adjacent (upper) side of the cowling-like section 106, thereby stabilizing the upper portion of the gate 108 against an inner surface 106A of the upper side of the cowling-like section 106 via increased friction. A joint 414 between the exterior surface of the cowling-like section 106 where it meets the vertical surface of body 104 of the carrier 102 automatically prevents injury to the confined animal from the distal section 412 (e.g., by preventing the distal section 412 from entering the inner space of the body 104). It should be noted that although FIG. 7 depicts the compression use of the anti-rattle device 402 along the top of the gate 108, this action also may be attained when the anti-rattle device 402 is used along the bottom or either side of the gate 108.

Figure 8B:
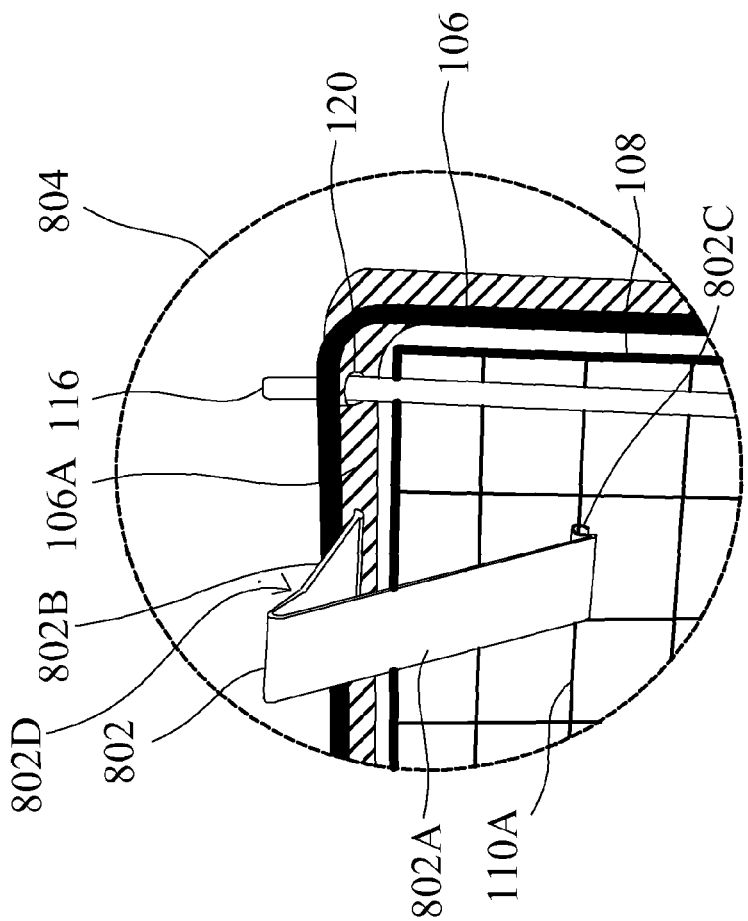
FIG. 8B is a simplified partial view illustrating the anti-rattle device of FIG. 8A installed on the animal carrier of FIG. 1A.
Figure 8A:
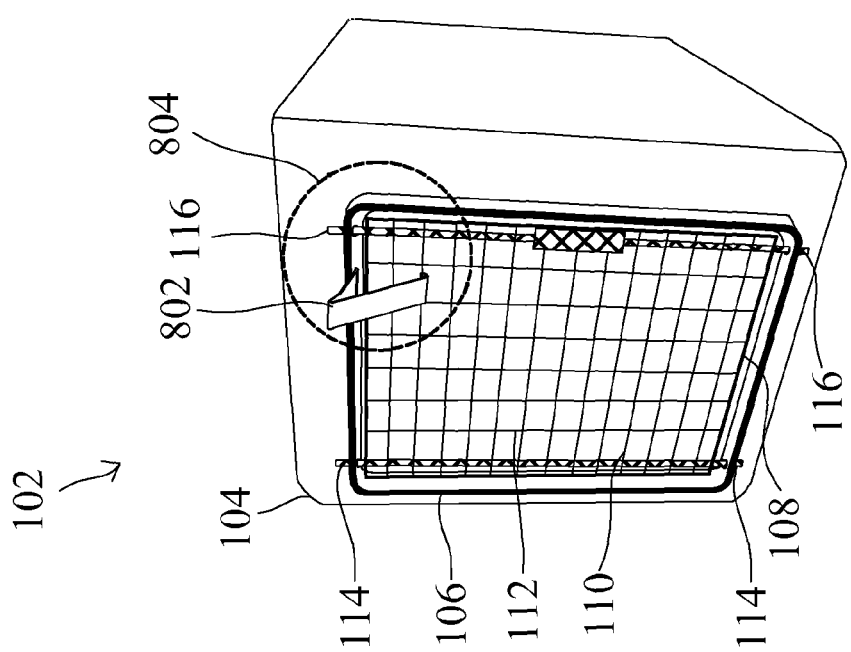
FIG. 8A is a simplified perspective view of an embodiment of an anti-rattle device installed on the animal carrier of FIG. 1A.

FIG. 8A illustrates a perspective view of another embodiment of an anti-rattle device 802. FIG. 8B is an enlargement of the view denoted by the dashed circle 804.

Referring to FIG. 8B, the anti-rattle device 802 includes a lower arm 802A and an upper arm 802B. The lower arm 802A comprises an attachment structure 802C that is used to releasably couple the anti-rattle device 802 to a rod (e.g., horizontal rod 110A in FIG. 8B) of the gate 108. As in the anti-rattle device 202 of FIGS. 2A and 2B, the anti-rattle device 802 is bent between the lower arm 802A and the upper arm 802B to enable the upper arm 802B to be slid under or over the cowling-like section 106.

In contrast with anti-rattle device 202 of FIGS. 2A and 2B, the upper arm 802B of the anti-rattle device 802 comprises a bent section 802D. In some aspects, in deployments where the anti-rattle device 802 is used in the expansion configuration (e.g., as depicted in FIG. 8B), the bent section 802D prevents the upper arm 802B from extending too far beyond the interior edge of the cowling-like section 106 into the interior space of the body 104 via a slipping action. In this way, injury that could otherwise occur to a confined animal due to the protrusion of the upper arm 802B into the interior of the carrier body 104 may be prevented. In some aspects, the bent section 802D may facilitate an effective springing action of the anti-rattle device 802 when the anti-rattle device 802 is installed. In some aspects, the bent section 802D may facilitate easy removal of the anti-rattle device 802 by ensuring that a portion of the anti-rattle device 802 extends from the front of the gate 108.

FIGS. 9A and 9B illustrate two views of an embodiment of an animal carrier gate anti-rattle device 902 corresponding to the anti-rattle device 802 shown in FIGS. 8A and 8B. FIG. 9A illustrates the anti-rattle device 902 from the right side, after it has been slightly rotated top-toward front. FIG. 9B illustrates the anti-rattle device 902 from a frontal perspective, after it has been slightly rotated slightly top-toward-front and axially toward the right. For purposes of illustration, the anti-rattle device 902 will be referred to as having a front surface F and a back surface B.

The anti-rattle device 902 may be similar in most respects to the anti-rattle device 402 of FIGS. 4A and 4B. For example, the anti-rattle device 902 may comprise an elastic elongated member; may have a shape that is relatively thin, narrow, and long; may be constructed, at least in part, of a material that has elastic properties; may be constructed of a thin metallic, plastic, or composite material; and so on.

The anti-rattle device 902 comprises two arms that are, in effect, delineated by a first bent section 904 of the anti-rattle device 902. The first bent section 904 has a bend angle BA1 of less than 90 degrees relative to the back surface B. For purposes of illustration, one arm is referred to as a lower arm LA and the other arm is referred to as an upper arm UA.

An end section 906 of the lower arm LA defines an attachment structure in the shape of a hook 908 that forms an opening 910 facing the front surface F. The hook 908 may correspond to (e.g., be the same as or similar to) the hook 408 of the anti-rattle device 402 of FIGS. 4A and 4B. For convenience, the end section 906 may be referred to herein as the proximal section of the elastic elongated member.

An end section 912 of the upper arm UA comprises a protrusion 914 that protrudes from the front surface F and from the back surface B. The protrusion 914 may correspond to (e.g., may be similar to) the protrusion 414 of the anti-rattle device 402 of FIGS. 4A and 4B. For convenience, the end section 912 may be referred to herein as the distal section of the elastic elongated member.

The upper arm UA comprises a second bent section 920 between the first bent section 904 and the protrusion 914 of the distal section 912. In some embodiments, the second bent section 920 has a bend angle BA2 of greater than 90 degrees relative to the front surface F. In some embodiments, the second bent section 920 has a bend angle BA2 of greater than 120 degrees relative to the front surface F. The bend angles BA1 and BA2 thus facilitate, upon compression or expansion of the elastic elongated member, the distal section 912 of the elastic elongated member being positioned on an inner or outer surface of the cowling-like section 106 when the proximal section 906 of the elastic elongated member is attached to a horizontal rod (e.g., rod 110) or a vertical rod (e.g., rod 112) of the gate 108.

Other aspects of the anti-rattle device 902 are similar to corresponding aspects of the anti-rattle device 402 of FIGS. 4A and 4B. For example, these devices may be constructed of similar materials, have similar stiffness, have similar dimensions, and be used in similar ways (e.g., expansion and compression uses). Thus, these aspects (e.g., materials, stiffness, dimensions, etc.) of the anti-rattle device 402 that were described in more detail above in conjunction with FIGS. 4A and 4B may be equally applicable to the anti-rattle device 902 in various embodiments. Accordingly, the features described by the reference numbers (e.g., 4xx) for the anti-rattle device 402 of FIGS. 4A and 4B may correspond to the reference numbers (e.g., 9xx) for the anti-rattle device 902.

FIGS. 10A-12 illustrate simplified views of the anti-rattle device 902 from the right-hand side of the animal carrier 102. FIGS. 10A and 10B illustrate more simplified views, while FIGS. 11 and 12 respectively illustrate a more detailed view of an expansion use and a compression use of the anti-rattle device 902. To further reinforce how an anti-rattle device may interact with the carrier 102, several of the components of the anti-rattle device 902 are specifically referenced in FIGS. 10A and 10B (and in other figures that follow). To avoid unnecessary repetition, however, not all of these components are discussed in the description of FIGS. 10A and 10B (and the other figures).

FIGS. 10A and 10B depict the anti-rattle device 902 in an unengaged position and an engaged position, respectively, along the top of the gate 108. For purposes of illustration, the gate 108 is depicted by a dashed vertical line to indicate that from this view the gate 108 is behind the right side of the cowling-like section 106.

In both FIGS. 10A and 10B, the anti-rattle device 902 is securely attached via the hook 908 to a horizontal stiff metal rod 110A comprising a portion of the gate 108. In the unengaged position of FIG. 10A, the gate 108 is neither pushed via expansion toward the opposite (lower) side of the cowling-like section 106 nor pulled via compression toward the adjacent (upper) side of the cowling-like section 106. In the engaged position of FIG. 10B, the gate 108 is pushed toward the opposite (lower) side of the cowling-like section 106 via expansion (described in more detail below in conjunction with FIG. 11). Alternatively, as described in more detail below in conjunction with FIG. 12, the gate 108 could be pulled toward the adjacent (upper) side of the cowling-like section 106 via compression (not shown in FIG. 10B).

Figure 11:
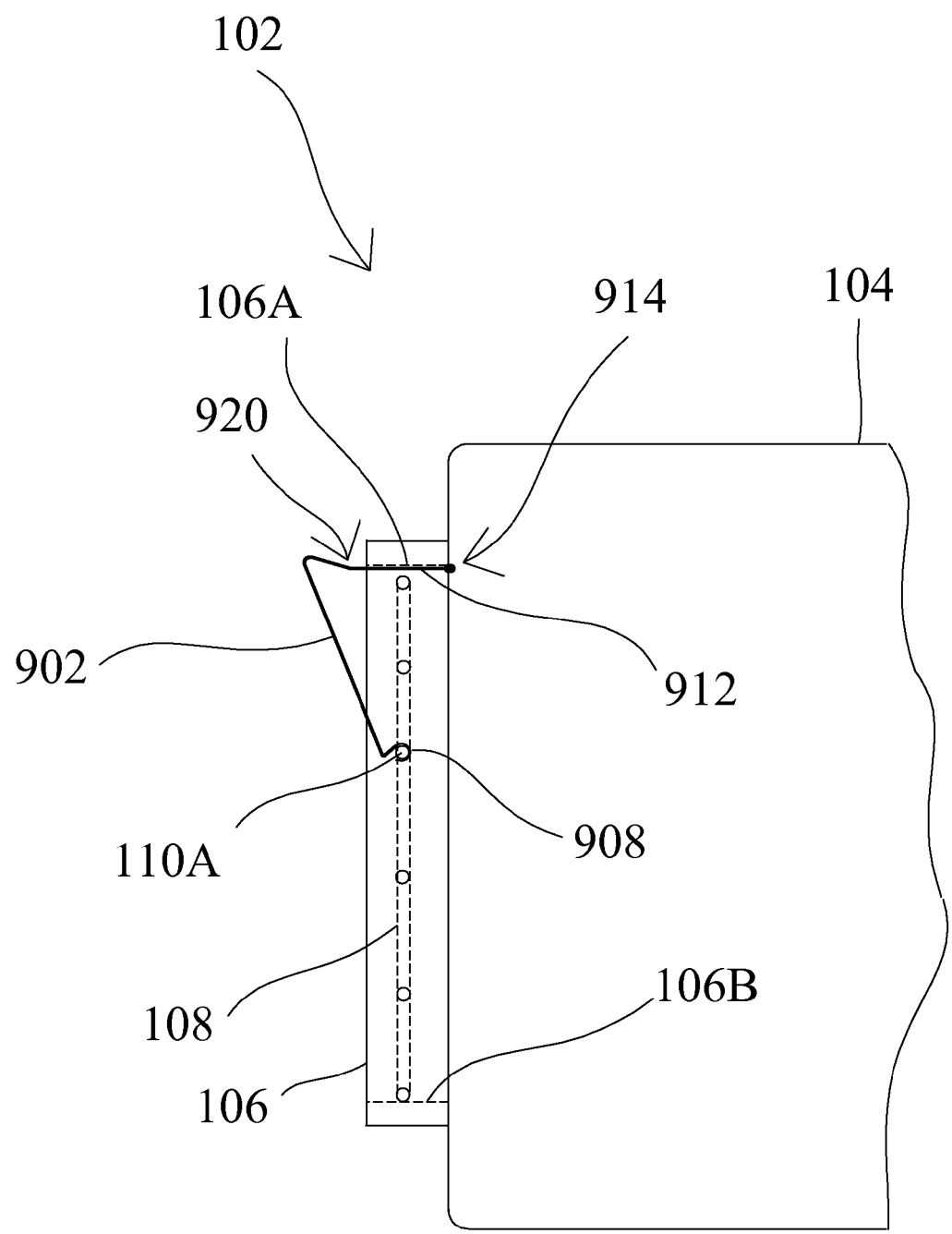
FIG. 11 is a simplified side view of the anti-rattle device of FIG. 9A in an engaged position on an inner surface of a cowling-like section of the animal carrier of FIG. 1A.

FIG. 11 is a more detailed view of the anti-rattle device 902 in an engaged position along the top of the gate 108 illustrating an example of expansion use. For purposes of illustration, the gate 108 is depicted by dashed vertical lines and circles to indicate that from this view the gate 108 is behind the right side of the cowling-like section 106.

In this expansion use configuration, the distal section 912 of the anti-rattle device 902 is positioned against an inner surface 106A (a lower surface in this example) of the cowling-like section 106 of the carrier 102. Consequently, due to the expansion action of the upper arm UA and the lower arm LA of the anti-rattle device 902, the gate 108 is pushed toward the opposite (lower) side of the cowling-like section 106, thereby stabilizing the lower portion of the gate 108 against an inner surface 106B of the lower side of the cowling-like section 106 via increased friction. It should be noted that although FIG. 11 depicts the expansion use of the anti-rattle device 902 along the top of the gate 108, this action also may be attained when the anti-rattle device 902 is used along the bottom or either side of the gate 108.

FIG. 11 also illustrates that in this configuration the protrusion 914 is positioned beyond an innermost edge (toward the interior of the body 104) of the inner surface 106A. Consequently, the protrusion 914 will tend to catch on the inner edge of inner surface 106A and prevent the distal section 912 from inadvertently sliding out (toward the left in FIG. 11) of the cowling-like section 106. In this case, the protrusion 914 may also provide a safety feature to prevent inadvertent injury to an animal confined within the carrier 102. Moreover, due to the second bent section 920 in this embodiment, the distal section 912 may lie flatter on the inner surface 106A (e.g., as compared to an anti-rattle device without this additional bent section), thereby improving the effectiveness of the protrusion 914.

Figure 12:
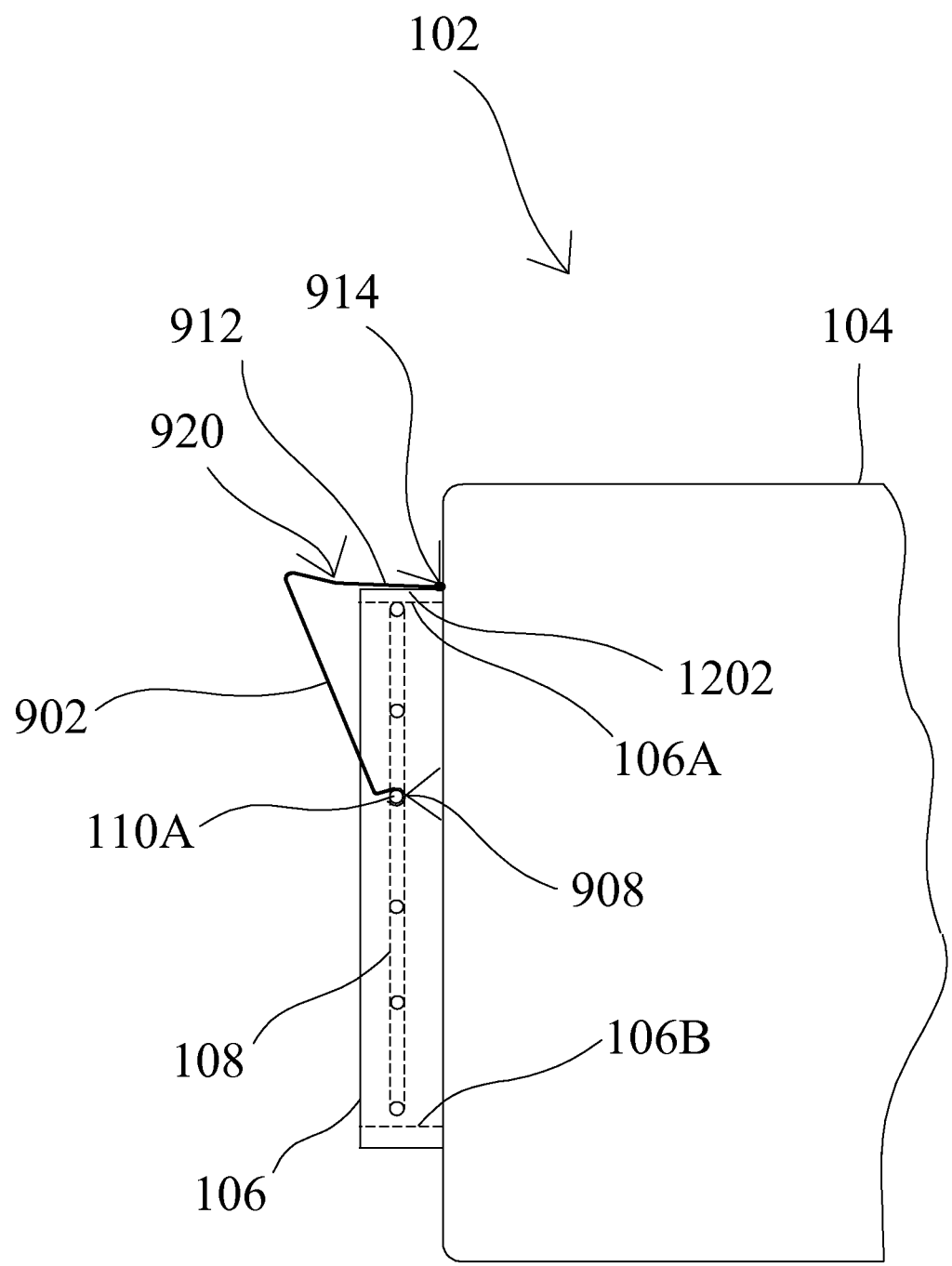
FIG. 12 is a simplified side view of the anti-rattle device of FIG. 9A in an engaged position on an outer surface of a cowling-like section of the animal carrier of FIG. 1A.

FIG. 12 is a more detailed view of the anti-rattle device 902 in an engaged position along the top of the gate 108 illustrating an example of compression use. For purposes of illustration, the gate 108 is again depicted by dashed vertical lines and circles to indicate that from this view the gate 108 is behind the right side of the cowling-like section 106.

In this compression-use configuration, the distal section 912 of the anti-rattle device 902 is positioned against an outer surface 1202 (an upper surface in this example) of the cowling-like section 106 of the carrier 102. Consequently, due to the compression action of the upper and lower arms of the anti-rattle device 902, the gate 108 is pulled toward the adjacent (upper) side of the cowling-like section 106, thereby stabilizing the upper portion of the gate 108 against an inner surface 106A of the upper side of the cowling-like section 106 via increased friction. A joint 914 between the exterior surface of the cowling-like section 106 where it meets the vertical surface of body 104 of the carrier 102 automatically prevents injury to the confined animal from the distal section 912 (e.g., by preventing the distal section 912 from entering the inner space of the body 104). It should be noted that although FIG. 12 depicts the compression use of the anti-rattle device 902 along the top of the gate 108, this action also may be attained when the anti-rattle device 902 is used along the bottom or either side of the gate 108.

As mentioned above, one or more animal carrier gate anti-rattle devices may be used along one or more of the top, bottom, or either side of the animal carrier gate 108. FIG. 13A illustrates a front view of an example where a first anti-rattle device 1302A is deployed in an expansion use along the top of the gate 108, while a second anti-rattle device 1302B is deployed in a compression use along the right side of the gate 108. Thus, the anti-rattle device 1302A and the anti-rattle device 1302B will serve to push the gate 108 down and to the right, respectively, independent of each other.

FIG. 13B is an enlargement of the view denoted by the dashed circle 1304. This figure illustrates how the use of the anti-rattle devices 1302A and 1302B serves to mitigate rattling of the gate 108 within the upper-right corner of the cowling-like section 106 of the animal carrier 102. Here, it may be seen that the rod 116 is being pushed to the right side 1306 of the hole 1308 in the cowling-like section 106 mitigating rattling of the gate 108 via increased friction. Moreover, the gate 108 is being pushed down, away from an interior surface 1310 of the cowling-like section 106, thereby mitigating rattling of the gate 108 via increased separation of the gate 108 from the interior surface 1310 of the cowling-like section 106. Consequently, the gate will be less likely to rattle against the sides of the hole 1308 and the illustrated portion of the interior surface 1310 of the cowling-like section 106.

FIG. 13C is an enlargement of another view denoted by the dashed circle 1312. This figure illustrates how the use of the anti-rattle devices 1302A and 1302B serves to mitigate rattling of the gate 108 within the lower-right corner of the cowling-like section 106 of the animal carrier 102. Here, it may be seen that the rod 116 is being pushed to the right side 1306 of the hole 1308 in the cowling-like section 106, thereby mitigating rattling of the gate 108 via increased friction. Moreover, the gate 108 is being pushed down, toward an interior surface 1314 of the cowling-like section 106, thereby mitigating rattling of the gate 108 via increased friction of the gate 108 with the interior surface 1314 of the cowling-like section 106. Consequently, the gate 108 will be less likely to rattle against the sides of the hole 1308 and the illustrated portion of the interior surface 1314 of the cowling-like section 106.

Figure 14B:
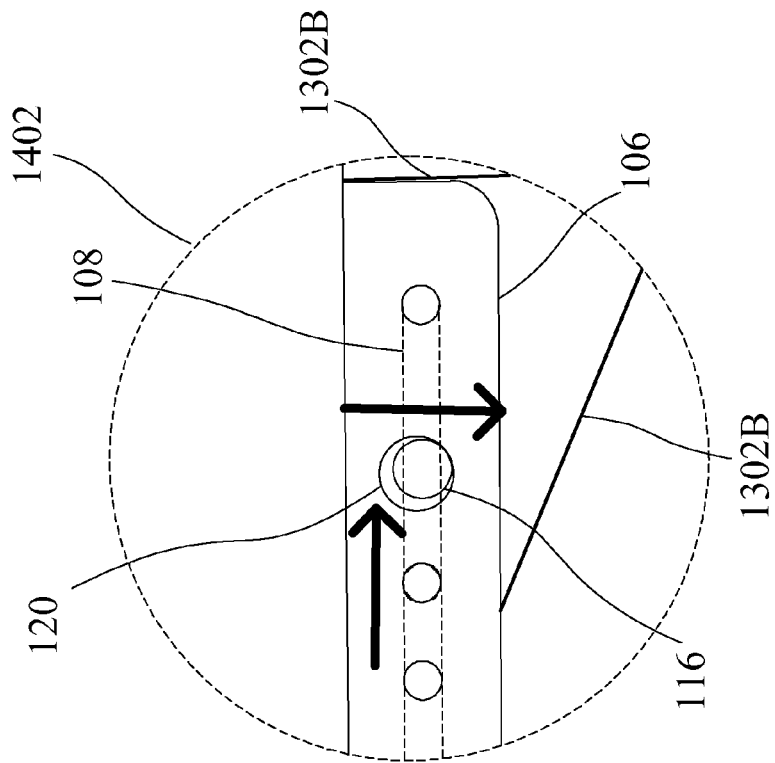
FIG. 14B is a simplified partial view illustrating potential effects of the anti-rattle devices of FIG. 14A on the gate of the animal carrier of FIG. 1A.
Figure 14A:
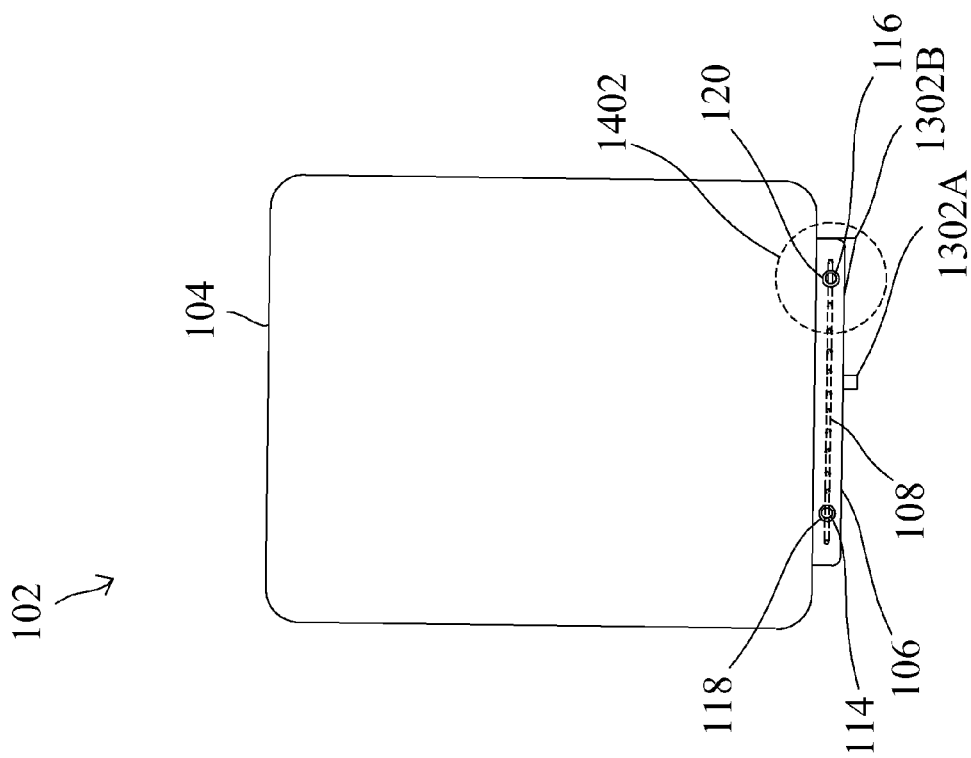
FIG. 14A is a simplified top view of anti-rattle devices in engaged positions on the animal carrier of FIG. 1A.

FIG. 14A illustrates a top view of the example of FIG. 13A. Again, the first anti-rattle device 1302A and the second anti-rattle device 1302B will serve to move the gate 108 down (into the drawing sheet) and to the right, respectively, from the view of FIG. 14A. In practice, the action of the anti-rattle devices 1302A and 1302B also may serve to push or pull the gate 108 in or out. FIG. 14B illustrates an example where the gate 108 is being pulled out.

FIG. 14B is an enlargement of the view denoted by the dashed circle 1402. This figure also illustrates how the use of the anti-rattle devices 1302A and 1302B serves to mitigate rattling of the gate 108. Here, it may be seen that the rod 116 is being pulled toward the right side and the front side of the hole 120 in the cowling-like section 106. Consequently, the gate will be less likely to rattle against the sides of the hole 120.

As mentioned above, an anti-rattle device may take various shapes. FIGS. 15A and 15B illustrate two views of an embodiment of an animal carrier gate anti-rattle device 1502 corresponding to, for example, the anti-rattle device 202 shown in FIGS. 2A and 2B and the anti-rattle device 802 shown in FIGS. 8A and 8B. FIG. 15A illustrates the anti-rattle device 1502 from the right side, after it has been slightly rotated top-toward front. FIG. 15B illustrates the anti-rattle device 1502 from a frontal perspective, after it has been slightly rotated slightly top-toward-front and axially toward the right. For purposes of illustration, the anti-rattle device 1502 will be referred to as having a front surface F and a back surface B. FIGS. 15A and 15B illustrate an embodiment of an anti-rattle device 1502, where an attachment structure (hook 1504) comprises a plurality of angular bends. As above, the hook 1504 comprises an opening 1506 to facilitate attaching the hook 1504 onto a rod (e.g., rods 110 and 112) of a gate 108. In addition, the hook 1504 comprises a first section 1508 that is bent relative to the back surface by less than or equal to approximately 90 degrees. In this embodiment, however, the hook 1504 comprises a second section 1510 is bent relative to the front surface (e.g., by less than or equal to approximately 90 degrees); as well as third and fourth sections 1512 and 1514 that are each bent relative to the front surface by greater than or equal to approximately 90 degrees.

An anti-rattle device may employ different types of protrusions or no protrusions at all. FIGS. 15A and 15B illustrate an embodiment that does not comprise a protrusion on the distal section 1516 of the anti-rattle device 1502. In other embodiments, a protrusion may be provided only on one side of such a distal section (e.g., top or bottom). In other embodiments, a protrusion may be provided on both sides of a distal section (e.g., top and bottom). In some embodiments, multiple protrusions (or other friction causing means such as a knurled surface) may be provided on one or both sides of a distal section. In the latter case, these protrusions may serve to prevent the anti-rattling device 1502 from slipping out of position.

Figures 16A, 16B:
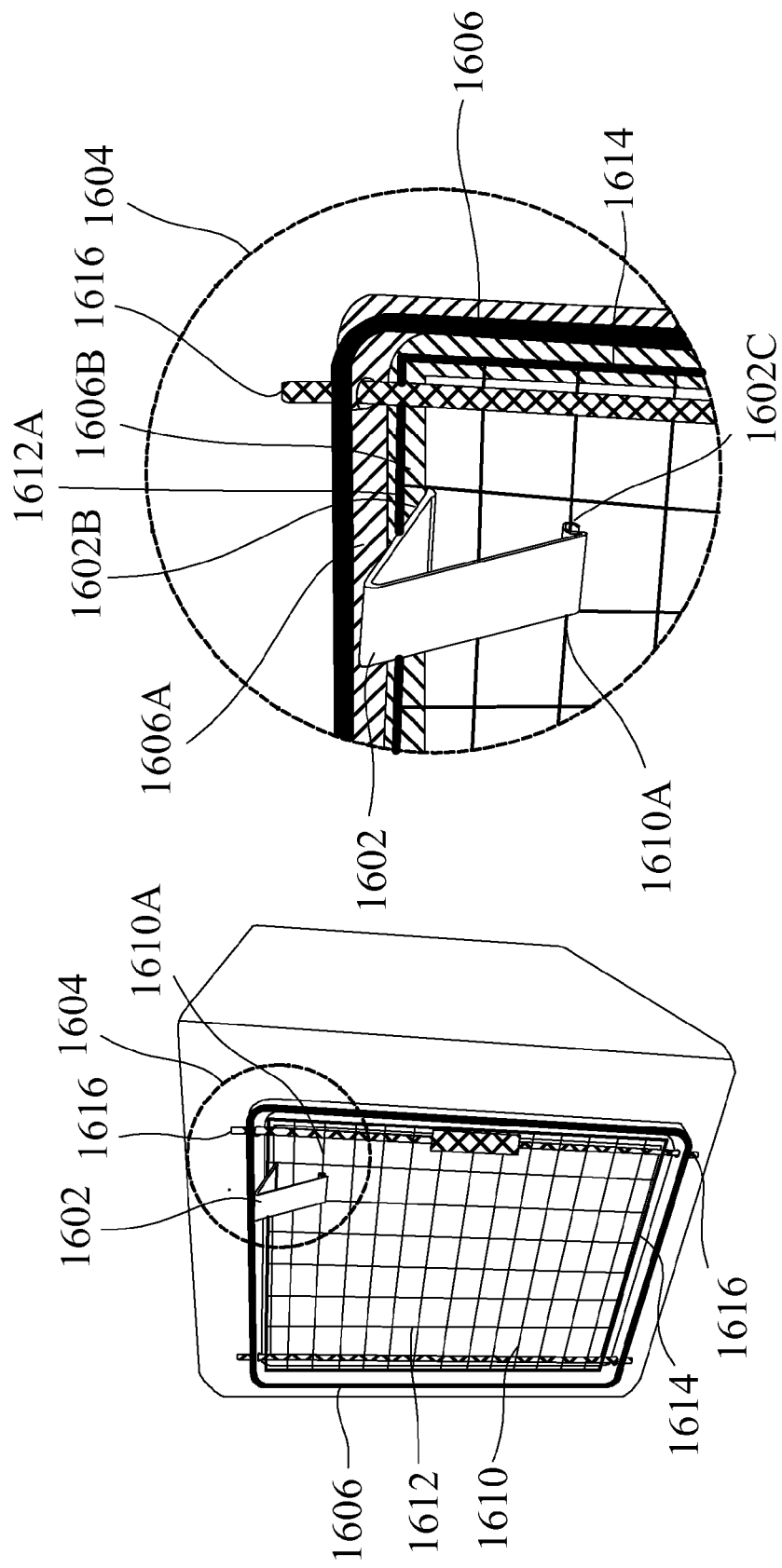
FIG. 16A is a simplified perspective view of an embodiment of an anti-rattle device installed on a sample animal carrier that has a flange-like surface located within a cowling-like opening.
FIG. 16B is a simplified partial view illustrating the anti-rattle device of FIG. 16A installed on the animal carrier of FIG. 16A.

FIGS. 16A and 16B illustrate an example of an anti-rattle device 1602 where a distal section 1602B of the anti-rattle device 1602 is placed under a downward running vertical flange 1606B upon installation of the anti-rattle device 1602. FIG. 16B is an enlargement of the view denoted by the dashed circle 1604. In both FIGS. 16A and 16B, the anti-rattle device 1602 is securely attached to the horizontal rod 1610A via the attachment structure 1602C. Here, due to the vertical flange 1606B extending below the lower surface 1606A of the cowling-like section 1606, the distal section 1602B of the anti-rattle device 1602 is routed under (yet not necessarily contacting) the top-most horizontal rod 1612A of the gate 1614. In FIGS. 16A and 16B, the components 1606, 1610, 1612, and 1616 correspond to similar components of FIG. 1 (i.e., components 106, 110, 112, and 116, respectively).

It should be appreciated that an anti-rattle device also may be employed for carriers that do not have a cowling-like section (e.g., cowling-like section 106). In such a case, the distal section of the anti-rattle device is placed underneath the portion of the body of the animal carrier (e.g., a front wall) that lies adjacent the gate 108.

It should be appreciated that the teachings herein may be implemented in a variety of ways. For example, the structure and functionality taught herein may be incorporated into various types of animal carriers (e.g., of various sizes and/or constructed of various types of materials) and into other types of apparatuses.

It also should be appreciated that an anti-rattle device as taught herein may be constructed using a variety of techniques, components, and materials. For example, an anti-rattle device may be made of a plastic material, a metallic material, a composite material, wood, some other material, or any combination of these materials. Also, various modifications of the shape of an anti-rattle device may be made consistent with the teachings herein. For example, as compared to the embodiments explicitly shown herein, an anti-rattle device may be longer, shorter, wider narrower, have more bends, have fewer bends, and so on.

Also, it should be understood that any reference to elements herein using a designation such as "first," "second," and so forth does not generally limit the quantity or order of those elements. Rather, these designations may be used herein as a convenient method of distinguishing between two or more different elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

While certain embodiments have been described above in detail and shown in the accompanying drawings, it is to be understood that such embodiments are merely illustrative of and not restrictive of the teachings herein. In particular, it should be recognized that the teachings herein apply to a wide variety of apparatuses and methods. It will thus be recognized that various modifications may be made to the illustrated embodiments or other embodiments, without departing from the broad scope thereof. In view of the above it will be understood that the teachings herein are intended to cover any changes, adaptations or modifications which are within the scope of the disclosure.

What is claimed is:

1. An animal carrier gate anti-rattle device, comprising:
an elastic elongated member having a front surface and a back surface and comprising:
a proximal section defining a hook that forms an opening facing the front surface to engage a rod of the gate, wherein the opening of the hook is greater than 0.05 inches wide;
a distal section; and a first bent section between the proximal section and the distal section, the first bent section having a bend angle of less than 120 degrees relative to the back surface.

2. The device of claim 1, wherein:
the first bent section has a bend angle of less than 90 degrees relative to the back surface;
the elongated member further comprises a second bent section between the first bent section and the distal section; and
the second bent section has a bend angle of greater than 90 degrees relative to the front surface.

3. The device of claim 2, wherein the second bent section has a bend angle of greater than 120 degrees relative to the front surface.

4. The device of claim 1, wherein the hook comprises at least one curvilinear bend.

5. The device of claim 1, wherein the hook comprises a plurality of angular bends.

6. The device of claim 1, wherein the hook comprises a first section that is bent relative to the back surface by less than or equal to approximately 90 degrees.

7. The device of claim 6, wherein the hook further comprises a second section that comprises at least one curvilinear bend toward to the front surface.

8. The device of claim 1, wherein the elongated member is constructed of a flat unitary material.

9. The device of claim 8, wherein the flat unitary material has a thickness that is less than 0.25 inches.

10. The device of claim 8, wherein the flat unitary material comprises a flat metallic material.

11. The device of claim 8, wherein the flat unitary material comprises a flat plastic material.

12. The device of claim 1, wherein the distal section comprises a protrusion that protrudes from the front surface.

13. The device of claim 12, wherein the protrusion protrudes from the front surface by a distance that is greater than 0.06 inches.

14. The device of claim 12, wherein the protrusion protrudes from the front surface by a distance that is less than 0.25 inches.

15. The device of claim 1, wherein:
a first length of the elongated member between an end of the distal section and the first bent section is less than 3.00 inches;
a second length of the elongated member between the hook and the first bent section is less than 4.00 inches; and
the elongated member is constructed of a flat material having a thickness that is less than 0.25 inches.

16. The device of claim 15, wherein:
the elongated member further comprises a second bent section between the first bent section and the distal section; and
the second bent section has a bend angle of greater than 120 degrees relative to the front surface.

17. The device of claim 1, wherein the opening of the hook is less than 0.30 inches wide.

18. The device of claim 1, wherein a length of the elongated member between an end of the distal section and the first bent section is less than 4.00 inches.

19. The device of claim 1, wherein a length of the elongated member between the hook and the first bent section is less than 12.00 inches.

20. The device of claim 1, wherein the first bent section has a bend angle of less than 90 degrees relative to the back surface.

* * * * *